United States Patent
Jokela et al.

(10) Patent No.: US 11,858,513 B2
(45) Date of Patent: Jan. 2, 2024

(54) VEHICLE TARGET OPERATIONAL SPEED BAND CONTROL METHOD AND APPARATUS

(71) Applicant: JAGUAR LAND ROVER LIMITED, Warwickshire (GB)

(72) Inventors: Tommi Jokela, Coventry (GB); Alex Plianos, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 525 days.

(21) Appl. No.: 16/981,436

(22) PCT Filed: Mar. 27, 2019

(86) PCT No.: PCT/EP2019/057719
§ 371 (c)(1),
(2) Date: Sep. 16, 2020

(87) PCT Pub. No.: WO2019/185714
PCT Pub. Date: Oct. 3, 2019

(65) Prior Publication Data
US 2021/0009128 A1   Jan. 14, 2021

(30) Foreign Application Priority Data
Mar. 30, 2018  (GB) ..................... 1805339

(51) Int. Cl.
*G08G 1/095* (2006.01)
*B60W 30/16* (2020.01)
(Continued)

(52) U.S. Cl.
CPC ...... *B60W 30/162* (2013.01); *B60W 30/0956* (2013.01); *B60W 30/146* (2013.01);
(Continued)

(58) Field of Classification Search
CPC ........... B60W 30/162; B60W 30/0956; B60W 30/146; B60W 30/18163; B60W 50/0097;
(Continued)

(56) References Cited

U.S. PATENT DOCUMENTS

2002/0138190 A1   9/2002  Hellmann et al.
2004/0102889 A1*  5/2004  Ibrahim ................ B60W 30/16
                                              180/170
(Continued)

FOREIGN PATENT DOCUMENTS

CN      101020453 A    8/2007
CN      102458944 A    5/2012
(Continued)

OTHER PUBLICATIONS

M. Seredynski, W. Mazurzyk, D. Khadraoui, "Multi-Segment Green Light Optimal Speed Advisory", 27th IDPSW, IEEE (Cambridge, MA, USA, May 20-24, 2013), 459-465, https://ieeexplore.ieee.org/document/6650919 (Year: 2013).*

(Continued)

*Primary Examiner* — Donald J Wallace
*Assistant Examiner* — Daniel M. Robert
(74) *Attorney, Agent, or Firm* — Carlson, Gaskey & Olds, P.C.

(57) ABSTRACT

The present disclosure relates to a method of generating a target operational speed band (53; 63; 67) for a host vehicle (1) travelling along a route. A first time-dependent obstacle (15-*n*, 18-*n*) is identified at a first location on the route. The first time-dependent obstacle (15-*n*, 18-*n*) is identified as hindering progress of the host vehicle (1) during a first time period (11). The first time-lin dependent obstacle (15-*n*, 18-*n*) is defined in a two-dimensional speed against distance map (50, 60). A first speed trajectory (51, 52; 61; 65, 66) is determined from a first point to a second point within the (Continued)

two-dimensional speed against distance map (50, 60). The second point represents the first location on the route and the determined first speed trajectory (51, 52; 61; 65, 66) represents the host vehicle (1) arriving at the first location at a first arrival time. The target operational speed band (53; 63; 67) is determined such that the first speed trajectory (51, 52; 61; 65, 66) forms one of an upper limit and a lower limit of the target operational speed band (53; 63; 67). The first arrival time is outside said first time period (11). The present disclosure also relates to a controller (2) for generating a target operational speed band (53; 63; 67); and to a vehicle (1).

14 Claims, 12 Drawing Sheets

(51) Int. Cl.
*B60W 30/095* (2012.01)
*B60W 30/14* (2006.01)
*B60W 30/18* (2012.01)
*B60W 50/00* (2006.01)
*B60W 20/00* (2016.01)

(52) U.S. Cl.
CPC .. *B60W 30/18163* (2013.01); *B60W 50/0097* (2013.01); *B60W 20/00* (2013.01); *G08G 1/095* (2013.01)

(58) Field of Classification Search
CPC ................. B60W 20/00; B60W 20/12; B60W 2050/0031; B60W 2552/05; B60W 2552/15; B60W 2552/20; B60W 2552/30; B60W 2554/4041; B60W 2554/801; B60W 2554/804; B60W 2555/60; B60W 2720/10; B60W 2720/103; B60W 2720/106; B60W 2754/30; B60W 30/143; B60W 30/16; B60W 30/18154; Y02T 10/40; G08G 1/095
See application file for complete search history.

(56) References Cited

U.S. PATENT DOCUMENTS

| | | | |
|---|---|---|---|
| 2010/0088002 A1 | 4/2010 | Welte | |
| 2013/0110315 A1* | 5/2013 | Ogawa | G08G 1/096716 701/1 |
| 2014/0046581 A1* | 2/2014 | Ota | B60W 40/04 701/408 |
| 2014/0180564 A1* | 6/2014 | Ichinokawa | B60W 50/14 701/123 |
| 2015/0006056 A1 | 1/2015 | Fairgrieve et al. | |
| 2015/0142207 A1* | 5/2015 | Flehmig | B60W 30/18163 701/1 |
| 2016/0231746 A1* | 8/2016 | Hazelton | G05D 1/0274 |
| 2018/0037227 A1 | 2/2018 | D'sa et al. | |
| 2018/0215386 A1* | 8/2018 | Naserian | B60W 50/0097 |
| 2018/0257615 A1* | 9/2018 | Rawashdeh | G06V 20/584 |
| 2019/0206247 A1* | 7/2019 | Xie | G08G 1/096716 |

FOREIGN PATENT DOCUMENTS

| | | | |
|---|---|---|---|
| CN | 104044593 B | 9/2014 | |
| CN | 104136296 A | 11/2014 | |
| CN | 106740842 A | 5/2017 | |
| EP | 2538397 A1 | 12/2012 | |
| EP | 2945140 A1 | 11/2015 | |
| JP | 2001199260 A | 7/2001 | |
| JP | 2008296798 A | 12/2008 | |
| WO | 2015177238 A1 | 11/2015 | |
| WO | 2017025163 A1 | 2/2017 | |
| WO | WO-2018115511 A1 * | 6/2018 | ............... G08G 1/04 |

OTHER PUBLICATIONS

Combined Search and Examination Report under Sections 17 and 18(3) for Application No. GB1805339.7 dated Sep. 27, 2018.
International Search Report and Written Opinion of the International Searching Authority for International application No. PCT/EP2019/057719 dated Jul. 12, 2019.
CN Office Action for Application No. CN 201980019726.0 dated Feb. 2011-2023.
CN Office Action for Application No. CN 201980019726.0 dated Feb. 2011-2023—English translation.
CN Application No. 201980019726.0, Notice of second review observations dated Aug. 25, 2023.

\* cited by examiner

VEHICLE TARGET OPERATIONAL SPEED BAND CONTROL METHOD AND APPARATUS

TECHNICAL FIELD

The present disclosure relates to a vehicle control method and apparatus. More particularly, but not exclusively, the present disclosure relates to a method of generating a target operational speed band for a host vehicle; and to a controller for generating a target operational speed band for a host vehicle. The present disclosure also relates to a vehicle incorporating a controller; and to a non-transitory computer-readable medium.

BACKGROUND

Vehicle-to-Infrastructure (V2I) and Vehicle-to-Vehicle (V2V) (collectively V2X) technologies are expected to become the norm in the coming decade. This presents new opportunities for predictive energy management strategies since the amount of available information about the vehicle environment is increasing beyond what is available from in-vehicle sensors. From the point of view of energy management strategy, this provides significant opportunities in the ability to anticipate future events and therefore to adapt the vehicle speed and propulsion system usage to improve energy efficiency. An example of how V2I information can be used for energy savings is when a traffic light communicates its current and future states to approaching vehicles. This allows approaching vehicles to adapt their approach speed profile so as to potentially avoid stopping at the traffic light, thus saving energy and increasing driver comfort. An example of how V2V information can be used for energy savings is when vehicles ahead of the host vehicle communicate their movements to other vehicles around them. For instance, if the host vehicle is approaching a congested area, it could anticipate the congestion and adapt its approach speed and propulsion system usage to improve energy efficiency, for example by increasing the amount of vehicle coasting and decreasing the use of friction brakes. The challenge is how to take full advantage of these new opportunities. An algorithm that calculates the desired target operational speed band and optionally also a propulsion system management strategy for different scenarios would be advantage.

SUMMARY OF THE INVENTION

Aspects of the present invention relate to a method, a vehicle and to a non-transitory computer-readable medium as claimed in the appended claims.

According to a further aspect of the present invention there is provided a method of generating a target operational speed band for a host vehicle travelling along a route, the method comprising:
identifying a first time-dependent obstacle at a first location on the route, the first time-dependent obstacle being identified as hindering progress of the host vehicle during a first time period;
defining the first time-dependent obstacle in a two-dimensional speed against distance map;
determining a first speed trajectory from a first point to a second point within the two-dimensional speed against distance map, the second point representing the first location on the route and the determined first speed trajectory representing the host vehicle arriving at the first location at a first arrival time; and
determining the target operational speed band such that the first speed trajectory forms one of an upper limit and a lower limit of the target operational speed band;
wherein said first arrival time is outside said first time period. The speed of the host vehicle may be controlled in dependence on the target operational speed band. The target operational speed band may define a speed range for the host vehicle. At least in certain embodiments, this may improve operating efficiency of the vehicle and/or reduce a time required to complete a trip.

Alternatively, or in addition, the method may comprise determining a second time period when the first time-dependent obstacle is identified as not hindering progress of the host vehicle. The target operational speed band may be determined such that the host vehicle arrives at the first location within the second time period.

The method may comprise outputting a target speed trajectory. The target speed trajectory may be partially or completely contained within the target operational speed band.

The first speed trajectory may be generated for a first acceleration limit of the host vehicle.

The first speed trajectory may form a lower limit of the target operational speed band. A cost penalty may be applied to a target speed trajectory which is less than the first speed trajectory.

The first speed trajectory may form an upper limit of the target operational speed band. A cost penalty may be applied to a target speed trajectory which is greater than the first speed trajectory.

The method may comprise determining a cost of a target speed trajectory. The cost may be determined by applying an acceleration cost penalty in respect of each portion of the target speed trajectory having a greater positive acceleration than a predefined positive acceleration threshold and/or a greater negative acceleration than a predefined negative acceleration threshold.

The method may comprise identifying a second time period during which the first time-dependent obstacle permits substantially unhindered progress of the host vehicle. The target operational speed band may be determined such that the first arrival time is inside said second time period.

The method may comprise determining a second speed trajectory from a first point to a second point within the two-dimensional speed against distance map, the second point representing the first location on the route and the determined first speed trajectory representing the host vehicle arriving at the first location at a second arrival time. The target operational speed band may be determined such that the second speed trajectory forms the other of the upper limit and the lower limit of the target operational speed band. The second arrival time may be outside the first time period.

The first speed trajectory may be generated for a first acceleration limit of the host vehicle.

The first obstacle may comprise a target vehicle travelling along at least a portion of the route. The first time period may comprise a time period during which the target vehicle is predicted as travelling on a section of the route identified as being unfavourable for performing an overtaking manoeuvre.

The method may comprise determining a second speed trajectory from the first point to the second point within the two-dimensional speed against distance map. The second speed trajectory may be calculated such that the host vehicle arrives at the second location at a second arrival time. The second speed trajectory may form the other of the upper limit and the lower limit of the target operational speed band.

The second arrival time may comprise a time that the target vehicle is predicted to arrive at the second location. The second location may represent an end of the section of the route identified as being unfavourable for performing an overtaking manoeuvre.

The second time period may comprise a time period during which the target vehicle is predicted as travelling on a section of the route identified as being favourable for performing an overtaking manoeuvre.

The method may comprise identifying a speed limit applicable for at least a part of the route between the current position of the host vehicle and the first location. The speed limit may define at least a portion of the upper limit of the target operational speed band.

The method may comprise identifying a plurality of obstacles on the route. The target operational speed band may be determined in respect of each obstacle identified on the route. A weighting may be applied to the calculation of each target operational speed band in dependence on the calculation performed in respect of at least one other obstacle identified on the route. The first arrival time for arriving at the first obstacle may be determined in dependence on an arrival time of the host vehicle at one or more other obstacle identified on the route.

According to a further aspect of the present invention there is provided a non-transitory computer-readable medium having a set of instructions stored therein which, when executed, cause a processor to perform the method described herein.

According to a further aspect of the present invention there is provided a controller for generating a target operational speed band for a host vehicle travelling along a route, the controller comprising:

processing means for receiving an input to identify a first time-dependent obstacle at a first location on the route, the first time-dependent obstacle being identified as hindering progress of the host vehicle during a first time period; and memory means connected to the processing means;

wherein the processing means is configured to:

define the first time-dependent obstacle in a two-dimensional speed against distance map;

determine a first speed trajectory from a first point to a second point within the two-dimensional speed against distance map, the second point representing the first location on the route and the determined first speed trajectory representing the host vehicle arriving at the first location at a first arrival time, the first arrival time being outside the first time period; and generate the target operational speed band;

wherein the first speed trajectory forms one of an upper limit and a lower limit of the target operational speed band.

Alternatively, or in addition, the processor may be configured to determine a second time period when the first time-dependent obstacle is identified as not hindering progress of the host vehicle. The target operational speed band may be determined such that the host vehicle arrives at the first location within the second time period.

The processing means may be in the form of a processor, such as an electronic processor. The memory means may be in the form a memory device.

The processing means may be configured to output a target speed trajectory. The target speed trajectory may be partially or completely contained within the target operational speed band.

The first speed trajectory may be generated for a first acceleration limit of the host vehicle.

The first speed trajectory may form the lower limit of the target operational speed band. A cost penalty may be applied to a target speed trajectory which is less than the first speed trajectory.

The first speed trajectory may form the upper limit of the target operational speed band. A cost penalty may be applied to a target speed trajectory which is greater than the first speed trajectory.

The processing means may be configured to determine a cost of a target speed trajectory. The cost may be determined by applying an acceleration cost penalty in respect of each portion of the target speed trajectory having a greater positive acceleration than a predefined positive acceleration threshold and/or a greater negative acceleration than a predefined negative acceleration threshold.

The processing means may be configured to identify a second time period during which the first time-dependent obstacle permits substantially unhindered progress of the host vehicle. The target operational speed band may be determined such that the first arrival time is inside said second time period.

The processing means may be configured to determine a second speed trajectory from a first point to a second point within the two-dimensional speed against distance map, the second point representing the first location on the route and the determined first speed trajectory representing the host vehicle arriving at the first location at a second arrival time.

The target operational speed band may be determined such that the second speed trajectory forms the other of the upper limit and the lower limit of the target operational speed band. The second arrival time may be outside said first time period.

The first speed trajectory may be generated for a first acceleration limit of the host vehicle.

The first obstacle may comprise a target vehicle travelling along at least a portion of the route. The first time period may comprise a time period during which the target vehicle is predicted as travelling on a section of the route identified as being unfavourable for performing an overtaking manoeuvre.

The processing means may be configured to determine a second speed trajectory from the first point to the second point within the two-dimensional speed against distance map, the second speed trajectory being calculated such that the host vehicle arrives at the second location at a second arrival time. The second speed trajectory may form the other of the upper limit and the lower limit of the target operational speed band.

The second arrival time may comprise a time that the target vehicle is predicted to arrive at the second location. The second location may represent an end of the section of the route identified as being unfavourable for performing an overtaking manoeuvre.

The second time period may comprises a time period during which the target vehicle is predicted as travelling on a section of the route identified as being favourable for performing an overtaking manoeuvre.

The processing means may be configured to identify a speed limit applicable for at least a part of the route between the current position of the host vehicle and the first location, wherein the speed limit defines at least a portion of the upper limit of the target operational speed band.

The processing means may be configured to:
identify a plurality of obstacles on the route; and
generate a target operational speed band in respect of each obstacle identified on the route.

The processing means may be configured to apply a weighting to the calculation of each target operational speed band in dependence on the calculation performed in respect of at least one other obstacle identified on the route.

The first arrival time for arriving at the first obstacle may be determined in dependence on an arrival time of the host vehicle at one or more other obstacle identified on the route.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A host vehicle 1 comprising a controller 2 in accordance with an embodiment of the present invention will now be described with reference to the accompanying figures. The controller 2 is configured to determine a target operational speed band of the host vehicle 1 in order to improve operating efficiency and/or to reduce journey time. The host vehicle 1 is a road vehicle, such as an automobile. It will be understood that the controller 2 may be implemented in other vehicle types, such as a utility vehicle, a sports utility vehicle (SUV), an off-road vehicle, etc.

Figure 3:
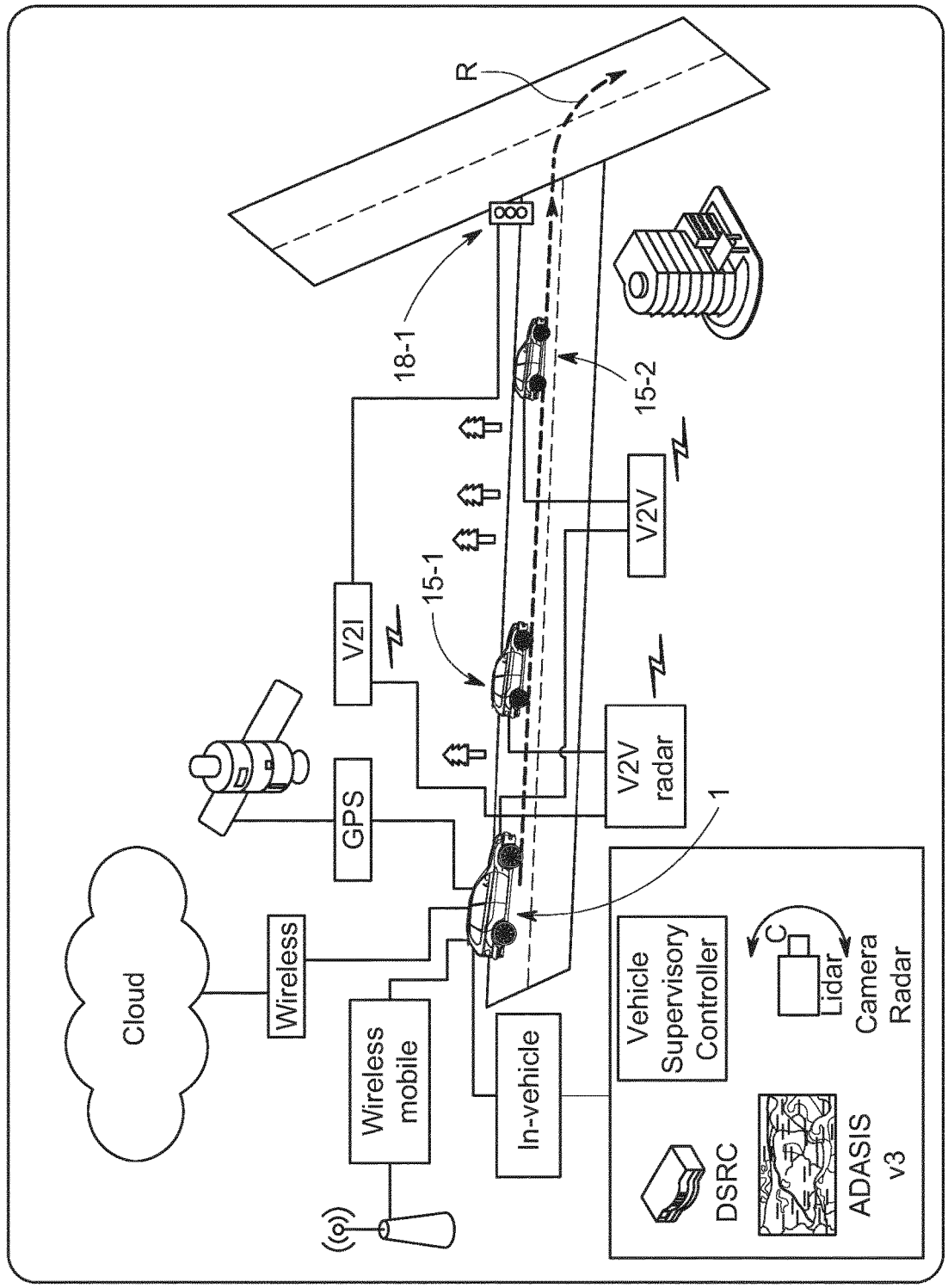
FIG. 3 shows a schematic representation of the communication between the host vehicle and surrounding infrastructure and target vehicles.

As described herein, the controller 2 is configured to implement a dynamic programming algorithm for controlling the target operational speed of the host vehicle 1 as it travels along a route R (illustrated in FIG. 3). The control algorithm may be implemented as part of an autonomous control function, for example comprising one or more of the following: Adaptive Cruise Control (ACC), Intelligent Cruise Control (ICC), Green Light Optimized Speed Advisory (GLOSA), and Traffic Jam Assist (TJA). Alternatively, or in addition, the algorithm may be used to coach a driver of the host vehicle 1 to follow a target operational speed or to remain with a target operational speed band, for example indicating when to lift off an accelerator pedal or when to change gear.

The host vehicle 1 in the present embodiment comprises a Plug-in Hybrid Electric Vehicle (PHEV) having a parallel hybrid system. The host vehicle 1 comprises an internal combustion engine (ICE) 3, a Belt Integrated Starter Generator (BISG) 4 and an Electric Rear Axle Drive (ERAD) 5. A traction battery 6 is provided for supplying electrical energy to the ERAD 5. The traction battery 6 is a high voltage (HV) battery in the present embodiment. The host vehicle 1 has a front axle 7 and a rear axle 8. The ICE 3 and the BISG 4 are configured selectively to output a traction torque to the front axle 7 to drive first and second wheels W1, W2. The ERAD 5 is configured to output a traction torque to the rear axle 8 to drive third and fourth wheels W3, W4. The ICE 3 is permanently connected to the BISG 4. The ICE 3 comprises a crankshaft 9 which is mechanically connected to a torque converter (not shown) which in turn is connected to a multi-speed transmission 11. A disconnect clutch 10 is provided for selectively disconnecting the crankshaft 9 from the transmission 11. As described herein, a torque demand $T_{wh,drv}$ is generated by an autonomous or semi-autonomous vehicle control system. The parallel hybrid system is operable in a plurality of hybrid powertrain modes to deliver the torque demand $T_{wh,drv}$. The hybrid powertrain modes comprise selectively operating one or more of the ICE 3, the BISG 4 and the ERAD 5 to deliver the torque demand $T_{wh,drv}$. The ERAD 5 may output a positive traction torque $T_{wh,erad}$ to propel the host vehicle 1; or a negative traction torque $T_{wh,erad}$ to regenerate energy for recharging the traction battery 6. The BISG 4 may output a positive traction torque $T_{wh,misg}$ to provide a torque assist for the ICE 3; or may output a negative traction torque to perform torque charging of the traction battery 6. When referring to power, torque, and speed signals, the subscript wh is used herein to indicate the wheel frame of reference; and the subscript wh is omitted to denote an actuator frame of reference. It will be understood that the controller 2 may be implemented in other drivetrain configurations, for example the ERAD 5 may be omitted. Alternatively, the controller 2 could be used in an Electric Vehicle (EV) which does not include an internal combustion engine.

Controller Architecture & Data Processing Functions

Figure 1:
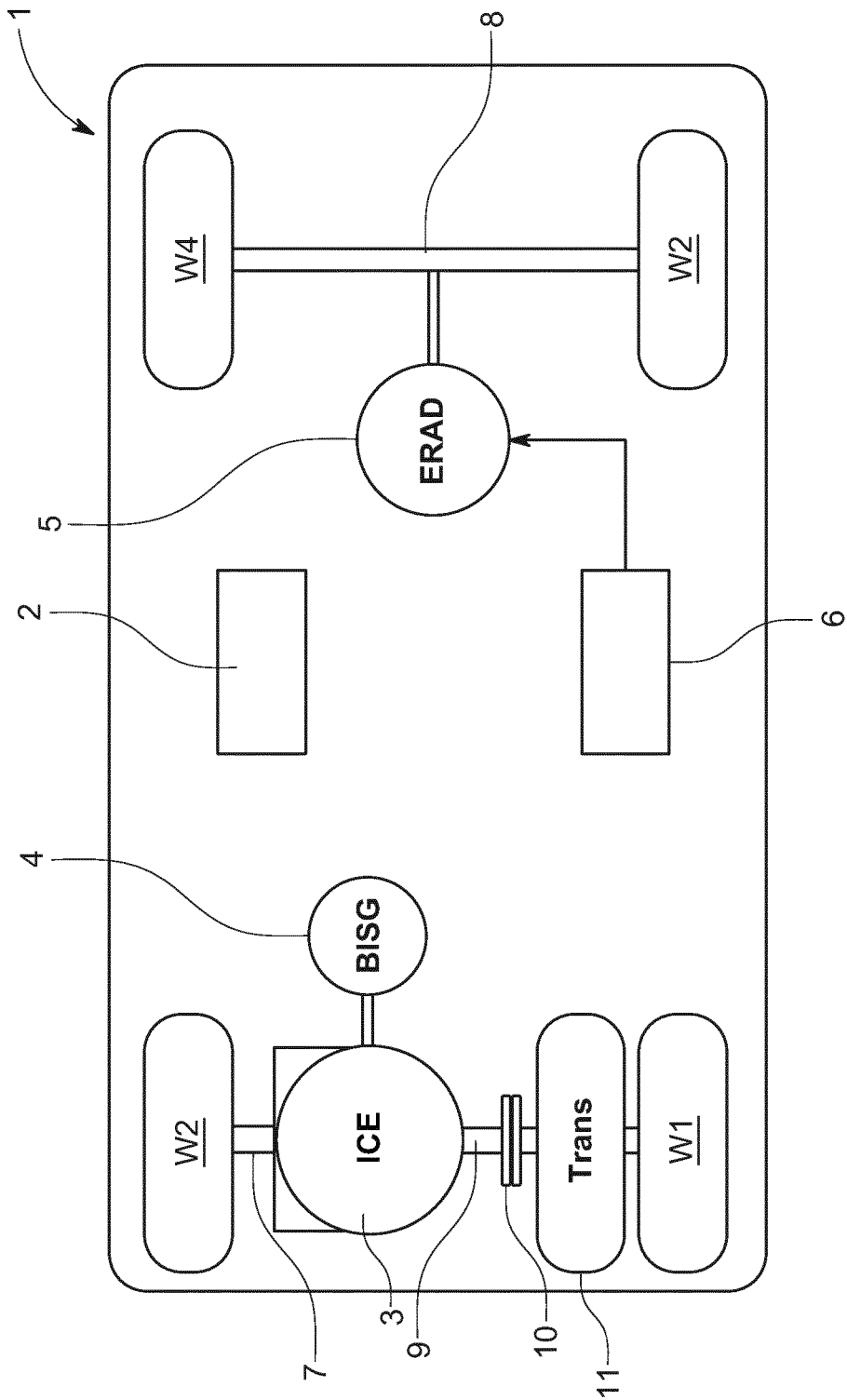
FIG. 1 shows a schematic representation of a host vehicle incorporating a controller in accordance with an embodiment of the present invention.
Figure 2:
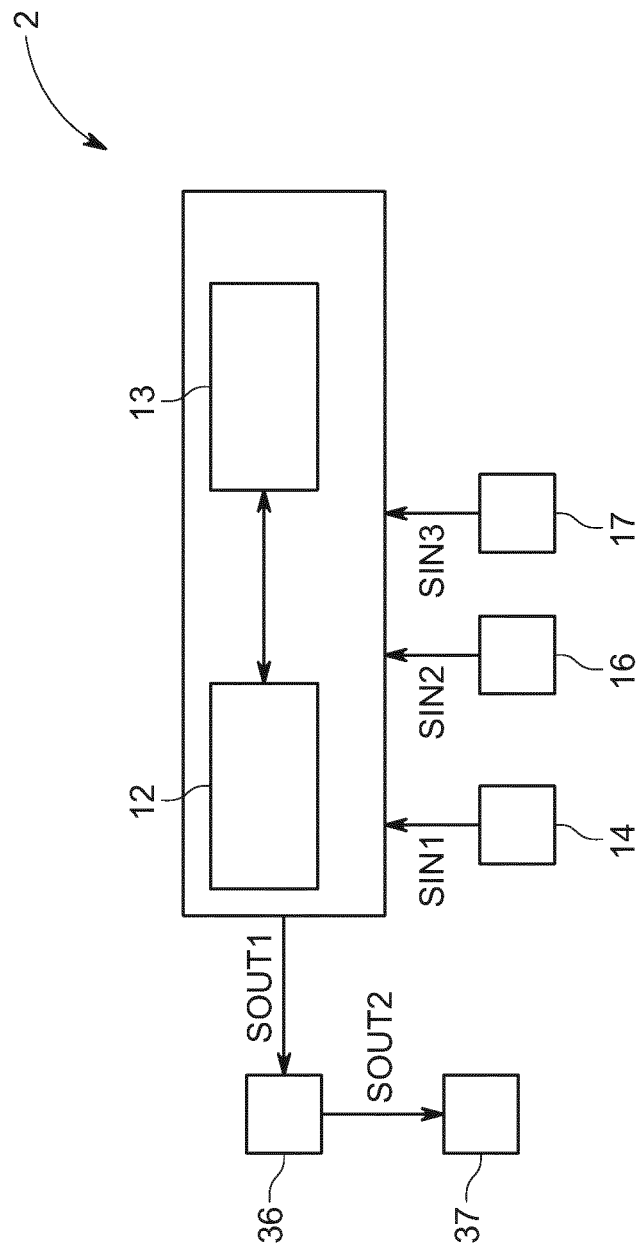
FIG. 2 shows a schematic representation of the integration of the controller shown in FIG. 1 with vehicle systems.

As illustrated in FIG. 2, the controller 2 comprises processing means in the form of a processor 12. The processor 12 is connected memory means in the form of a system memory 13. A set of computational instructions is stored on the system memory 13 and, when executed, the computational instructions cause the processor 12 to perform the method(s) described herein. The processor 12 is configured to receive a first electrical input signal SIN1 from a transceiver 14. The transceiver 14 is configured to communicate with one or more target vehicle 15-*n* (where the suffix n differentiates between different target vehicles) proximal to the host vehicle 1 or along the route R of the host vehicle 1; this form of communication is referred to herein as Vehicle-2-Vehicle (V2V) communication. Alternatively, or in addition, the transceiver 14 is configured to communicate with infrastructure, such as one or more traffic control signals 18-*n* (where the suffix n differentiates between different traffic control signals); this form of communication is referred to herein as Vehicle-2-Infrastructure (V2I) communication. The V2V and V2I communication are collectively referred to as V2X communication.

The processor 12 is configured to receive a second electrical input signal SIN2 from at least one vehicle sensor 16 provided on-board the host vehicle 1. The at least one vehicle sensor 16 in the present embodiment comprises a forward-looking radar 16 provided on the host vehicle 1. The processor 12 is configured to receive a third electrical input signal SIN3 from a navigation system 17 to determine a geospatial location of the host vehicle 1. The processor 12 may implement a route planning function to determine the route R, for example to plan the route from a current position of the host vehicle 1 to a user-specified destination. The processor 12 may access geographic map data stored on the system memory 13 to implement the route planning function. The geographic map data may, for example, comprise a road network. Alternatively, the route planning may be performed by a separate control unit, for example integrated into the navigation system 17.

The target vehicle 15-*n* may hinder or impede progress of the host vehicle 1 depending on where the host vehicle 1 encounters the target vehicle 15-*n*. The host vehicle 1 may be hindered if the target vehicle 15-*n* is encountered on a section of the current route R which is unfavourable for performing an overtaking manoeuvre, but may continue substantially unhindered if the target vehicle 15-*n* is encountered on a section of the current route R which is favourable for performing an overtaking manoeuvre, for example a section of road or highway having multiple lanes. The location where the host vehicle 1 encounters the target vehicle 15-*n* is a function of time and the relative speed of the host vehicle 1 and the target vehicle 15-*n*. The traffic control signals 18-*n* may hinder or impede progress of the host vehicle 1 depending on the time when the host vehicle 1 arrives at the traffic control signals 18-*n*. The host vehicle 1 may be hindered by the traffic control signals 18-*n* if the host vehicle 1 arrives at the traffic control signals during a red phase (i.e. when traffic is prohibited from proceeding). The host vehicle 1 may continue substantially unhindered if the host vehicle 1 arrives at the traffic control signals 18-*n* during a green phase (i.e. when traffic is allowed to proceed). favourable for performing. Thus, the target vehicle 15-*n* and the traffic control signals 18-2 are referred to herein as time-dependent obstacles. Other time-dependent obstacles include, for example, a pedestrian crossing or a level-crossing.

Vehicle Modeling

The dynamic programming algorithm uses a backward-facing quasi-static longitudinal vehicle model for the optimization of the vehicle speed trajectory and the powertrain state. This model is now described in more detail.

Vehicle Longitudinal Dynamics

In quasi-static simulations, the input variables are the vehicle speed $V_{veh}$, the vehicle acceleration, $a_{veh}$, and the road gradient angle $\theta_{road}$. The input variables are assumed to be constant for a short discretization step, $\Delta t$. The tractive force $F_{drv}$ required to drive the vehicle for a given profile, is calculated by Newton's $2^{nd}$ law, expressed as:

$$F_{drv}=M_{veh}a_{veh}+F_r+F_a+F_g \tag{1}$$

where $m_{veh}$. In denotes the vehicle inertia mass of the vehicle including all rotational inertias. Friction force $F_r$, the aerodynamic drag force $F_a$, and the gravitation force induced by the road gradient $F_g$ are expressed in the following equations:

$$F_r=c_r m_{veh} g \cos(\theta_{road}) \tag{2}$$

$$F_a=0.5\rho_a A_f c_d V_{veh}^2 \tag{3}$$

$$F_g=m_{veh} g \sin(\theta_{road}) \tag{4}$$

where $c_r$ is the rolling friction coefficient, g is the gravitational acceleration, $\rho_a$ is the density of air, $A_f$ is the vehicle's frontal area, and $c_d$ is the aerodynamic drag coefficient. The vehicle combined wheel torque is then calculated by the following equation:

$$T_{wh,drv}=F_{drv}r_{wh} \tag{5}$$

where $r_{wh}$ is the wheel radius.

Assuming no wheel slip and that the rotational speed for all wheels is equal, the wheel speed is given by:

$$\omega_{wh}=F_{drv}/r_{wh} \tag{6}$$

The tractive torque is distributed across the front and rear axles 7, 8 according to the control input $u_1 \in [0,1]$, respectively as follows:

$$T_{wh,drv,rr}=T_{wh,drv}u_1 \tag{7}$$

$$T_{wh,drv,fr}=T_{wh,drv}(1-u_1) \tag{8}$$

where $T_{wh,drv,rr}$ and $T_{wh,drv,fr}$ denote the tractive torque at the rear axle 8 and the front axle 7, respectively.

Rear Axle Model

The torque $T_{erad}$ at the output shaft of the ERAD 5 is calculated from the corresponding torque at the wheel, $T_{wh,drv,rr}$ after considering all lumped driveline losses $\eta_{gb,erad}$ and transmission ratio $v_{gb,erad}$:

$$T_{erad} = \begin{cases} \dfrac{T_{wh,drv,rr} \eta_{gb,erad}}{v_{gb,erad}}, & T_{wh,drv,rr} < 0 \\ \dfrac{T_{wh,drv,rr}}{\eta_{gb,erad} \, v_{gb,erad}}, & T_{wh,drv,rr} \geq 0 \end{cases} \quad (9)$$

Similarly, the rotational speed $\omega_{erad}$ at the output shaft of the ERAD 5 is expressed as:

$$\omega_{erad} = \omega_{wh} v_{gb,erad} \quad (10)$$

The electrical power of the ERAD 5, including lamped power losses of the motor and inverter are formulated in look-up maps of the form:

$$P_{ele,erad} = f_{loss,erad}(T_{erad}, \omega_{erad}, V_{batt}) \quad (11)$$

where $V_{batt}$ is the voltage of the traction battery 6.

Front Axle Model

Similarly to the rear axle, and assuming that the torque converter is in a locked up state, the torque converter input torque $T_{crnk}$ is given by:

$$T_{crnk} = \begin{cases} \dfrac{T_{wh,drv,fr} \eta_{gb,fr}}{v_{gb,fr}(\kappa_{gr})}, & T_{wh,drv,rr} < 0 \\ \dfrac{T_{wh,drv,fr}}{\eta_{gb,fr} \, v_{gb,fr}(\kappa_{gr})}, & T_{wh,drv,rr} \geq 0 \end{cases} \quad (12)$$

where $\eta_{gb,fr}$ is the efficiency of the front axle transmission and driveline including the losses of the torque converter. The gear ratio $v_{gb,fr}$ is a function of the gear $\kappa_{gr}$ which is determined by a gear shifting strategy:

$$\kappa_{gr} = f_{gr}(\omega_{wh}, T_{wh,drv,fr}) \quad (13)$$

Alternatively, the gear $\kappa_{gr}$ could be optimized as part of the powertrain control. The input rotational speed $\omega_{crnk}$ of the torque converter is given by:

$$\omega_{crnk} = \omega_{wh} v_{gb,fr} \quad (14)$$

Given a transmission ratio $v_{bisg}$ of the BISG 4, the engine torque $T_{eng}$ is expressed as:

$$T_{eng} = T_{crnk} = v_{bisg} T_{bisg} \quad (15)$$

where the BISG torque $T_{bisg}$ is expressed as a function of the optimization variable $u_2 \in [-2,1]$:

$$T_{bisg} = u_2 T_{crnk} \quad (16)$$

The instantaneous fuel flow $\dot{m}_f$ of the ICE 3 can be obtained by a steady state map which is expressed as:

$$\dot{m}_f = f_f(T_{eng}, \omega_{crnk}) \quad (17)$$

A fully warm engine is assumed allowing the dependency to ICE coolant/oil temperatures to be dropped. Similar to the ERAD 5, the electrical power of the BISG 4 is formulated in look-up maps of the form:

$$P_{ele,bisg} = f_{ele,bisg}(T_{bisg}, \omega_{crnk}, V_{batt}) \quad (18)$$

Traction Battery Model

The dynamics of the traction battery 6 are considered and modelled as an equivalent circuit consisting of $n_{cell}$ battery cells connected in series. Each cell circuit consists of a resistance and a voltage source. Assuming the same charge and temperature, $T_{hv,batt}$ across the battery pack, the total resistance and open voltage source are, given by the following equations:

$$R_{hv,batt} = f_R(SOC, T_{hv,batt}) \quad (19)$$

$$V_{oc,batt} = f_v(SOC, T_{hv,batt}) \quad (20)$$

The rate of change of SOC is expressed by:

$$S\dot{O}C = \dfrac{V_{oc,batt} - \sqrt{V_{oc,batt}^2 - 4P_{batt} R_{hv,batt}}}{2R_{hv,batt} \, Q_{hv,batt}} \quad (21)$$

where $Q_{hv,batt}$ is the HV battery capacity and $P_{batt}$ is the HV battery net power. The net traction battery power is expressed in terms of the required sum of electrical consumers:

$$P_{batt} = P_{ele,erad} + P_{ele,bisg} + P_{dcdc} \quad (22)$$

where $P_{dcdc}$ represents all auxiliary power requests, i.e. DCDC and air-conditioning.

Vehicle model Constraints and Validation

The model accounts for system constraints so as to disregard any infeasible solutions. The constraints considered in this work include the following:

ICE steady-state torque limits
ERAD and BISG torque limits
Driveline torque limits
Traction battery power and SOC limits One or more of these constraints may be used when determining acceleration limits of the host vehicle 1.

Predictive Control Algorithm

Optimal Control Theory & Dynamic Programming

A brief summary of the relevant control theory and mathematical formulation of dynamic programming now follows.

Optimal Control Problem Formulation

The optimal control problem can be described by first defining a discrete dynamic system $x_{k+1}$ with n states $x_k$, m inputs $u_k$, and l exogenous inputs $\omega_k$. This can be stated as follows: find an admissible control policy $\pi = \{\mu_0(x), \mu_1(x), \ldots, \mu_{N-1}(x)\}$ for $k=0,1,\ldots,N-1$ such that the cost function (Equation 23) is minimized and the constraints (Equations 25 to 29) are satisfied.

$$\min_{u_k \in U_k} \left\{ g_N(x_N) + \Sigma_0^{N-1} g_k(x_k, u_k, \omega_k) \right\} \quad (23)$$

$$x_{k+1} = f_k(x_k, u_k, \omega_k) \quad (24)$$

$$x_k \in X_k \subseteq R^n \quad (25)$$

$$x_0 = x_{IC} \quad (26)$$

$$x_N \in T \subseteq R^n \quad (27)$$

$$u_k \in U_k \subseteq R^m \quad (28)$$

$$w_k \in W_k \subseteq R^l \quad (29)$$

$$\forall k = 0, 1, \ldots, N-1 \quad (30)$$

The function $g_N(x_N)$ is the terminal cost term and the term $g_k(x_k, u_k, \omega_k)$ is the stage cost, i.e. the cost associated with applying the control action $u_k$, at a discrete time (or distance) k to the discrete time dynamic system (Equation 24). The notation for the functions $f_k$, $g_k$ indicates that both the cost term and the dynamic system can be time-varying. The initial condition is set to $x_{IC}$ and the state at the last iteration is constrained within the set T. The state variables, control inputs and exogenous inputs are constrained into time-variant sets $X_k$, $U_k$, and $W_k$, respectively.

Dynamic Programming

The dynamic programming algorithm is an optimization method which identifies a global optimal solution given a problem formulation and constraints. The dynamic programming algorithm is based on what is referred as Bellman's "Principle of Optimality" to simplify a complex problem by breaking it down to smaller chunks recursively, without sacrificing optimality 25 (Bellman, R., "Dynamic programming," (Courier Corporation, 2013)). Typically, the dynamic programming algorithm is used to determine the optimal controller which is not causal as to produce a benchmark for any other causal controller. On the assumption that all the future disturbances and reference inputs are known at the onset of computation, the controller 2 could be used in real-time control applications.

For the optimal control problem to be solved numerically, the time (or distance), the state space, and the control space need to be discretized. At index k, the state space is discretized to the set $X_k=\{x_k^1, x_k^2, \ldots, x_k^p\}$, where the superscript denotes the grid point at a given index k, with p indicating the number of grid points at x index. Similarly, the control space set is defined as $U_k=\{u_k^1, \ldots, u_k^p\}$. The dynamic programming algorithm proceeds backwards in time (or distance) from N−1 to 0 to evaluate the optimal cost-to-go function $J_k(x^i)$ at every grid point in the discretized distance (or time) space:

1. End cost calculation step:

$$J_N(x^i) = \begin{cases} g_N(x^i), \text{ for } x^i \in T \\ \infty, \text{ else} \end{cases} \quad (31)$$

2. Intermediate calculation step:

$$J_k(x^i) = \min_{u_k \in U_k} \{g_k(x^i \cdot u_k) + J_{k+1}(f_k(x^i, u_k, \omega_k))\} \quad (32)$$

The control policy $\pi=\{u_0(x), \mu_1(x), \ldots, \mu_{N-1}(x)\}$ is optimal if it consists of the optimal control signal at each node which minimizes the right side of this equation. Multilinear interpolation is used to evaluate the cost to go function when the control policy falls between grid points.

The communication between the host vehicle 1 and the surrounding infrastructure and target vehicles 15-n is illustrated in FIG. 3. The controller 2 in the preset embodiment is scalable depending on the level of information available and is operable when V2V and/or V2I communication is unavailable. The controller 2 communicates with infrastructure, such as the traffic control signals 15-n on the route R. The controller 2 also communicates with one or more target vehicle 15 to assess the traffic surrounding the host vehicle 1, for example the traffic ahead of the host vehicle 1 on the route R. The controller 2 may optionally communicate with a remote server, for example over a wireless communication network, to extend the horizon. The communication with the remote server may identify a road incident on the route R and/or provide real-time traffic information on the route R.

Figure 4:
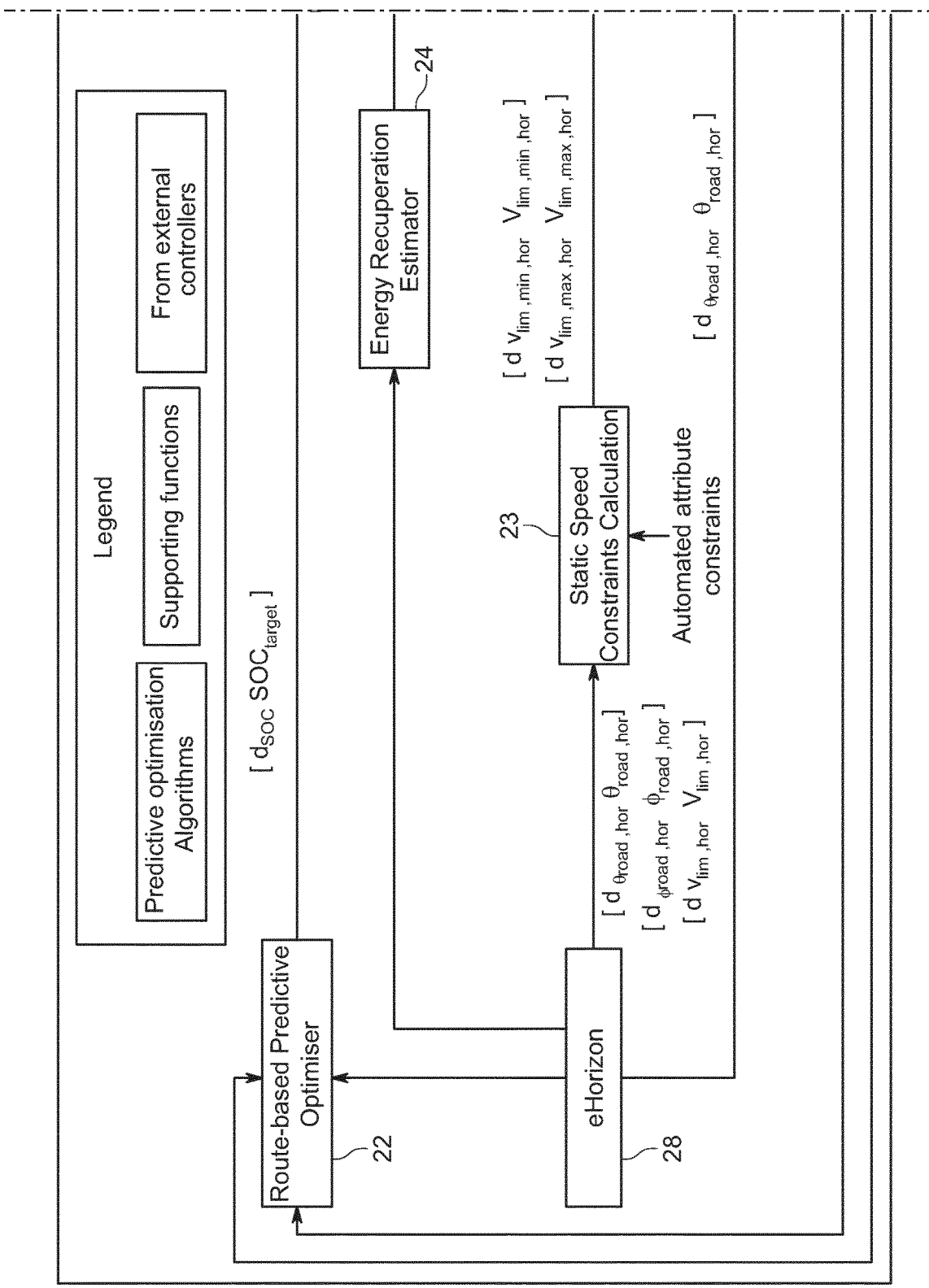
FIG. 4 shows a schematic representation of the architecture of the controller 2 shown in FIG. 1.
Figure 4:
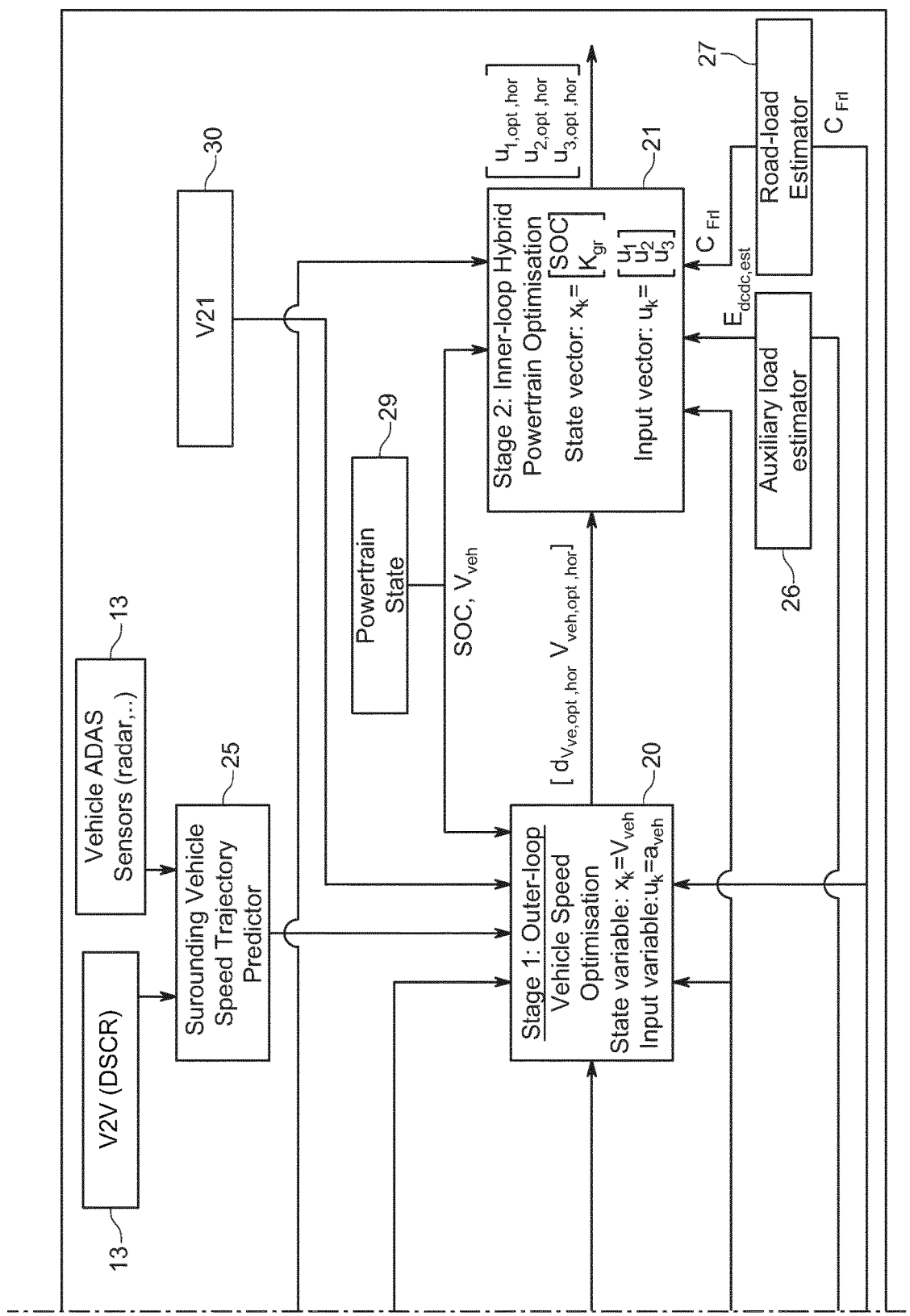

The acceleration of the host vehicle 1 is controlled in response to road attributes, such as road curvature, changes in altitude, altitude, intersections and traffic control signals; and/or changes in driving conditions, such as speed limits and traffic/congestion. The controller 2 may also be configured to take account of additional factors. For example, the selection of a low cruising speed may improve operating efficiency but result in an unacceptable increase in the journey time. The journey time to energy usage trade-off, is typically nonlinear and will depend on the specific driving scenario. A schematic representation of the architecture of the controller 2 is shown in FIG. 4. The functions are categorized as: (i) predictive control algorithms; (ii) supporting functions that combine information from various sources; and (iii) vehicle on-board controllers which supply the necessary information. The predictive control algorithms comprise a vehicle speed control unit 20 and a hybrid powertrain control unit 21. The supporting functions comprise a route-based predictive optimizer 22, a static speed constraints calculator 23, an energy recuperation estimator 24, a target vehicle speed trajectory predictor 25, an auxiliary load estimator 26 and a road-load estimator 27. The vehicle on-board controllers comprise a route preview calculator 28, such as an eHorizon module available from Continental AG; a powertrain control module 29 and a V2I communication module 30. The route-based predictive optimizer 22 is used to pre-emptively determine a State of Charge (SOC) of the traction battery 6 throughout a journey. The route-based predictive optimizer 22 may, for example, takes into consideration trip information such as one or more of the following: road speed limits, historical aggregated vehicle speed, road gradient, road type and the available energy from the traction battery 6. The road-load estimator 27 is provided to estimate the traction torque requirement. The auxiliary load estimator 26 may, for example, predict DC-DC converter and HVAC demand. The energy recuperation estimator 24 estimates energy recuperation. The hybrid powertrain control unit 21 is configured to constantly adapts the level of deceleration of the host vehicle 1 in dependence on the determined SOC and the future potential for energy recuperation.

Static Velocity Limit Determination

Figure 5:
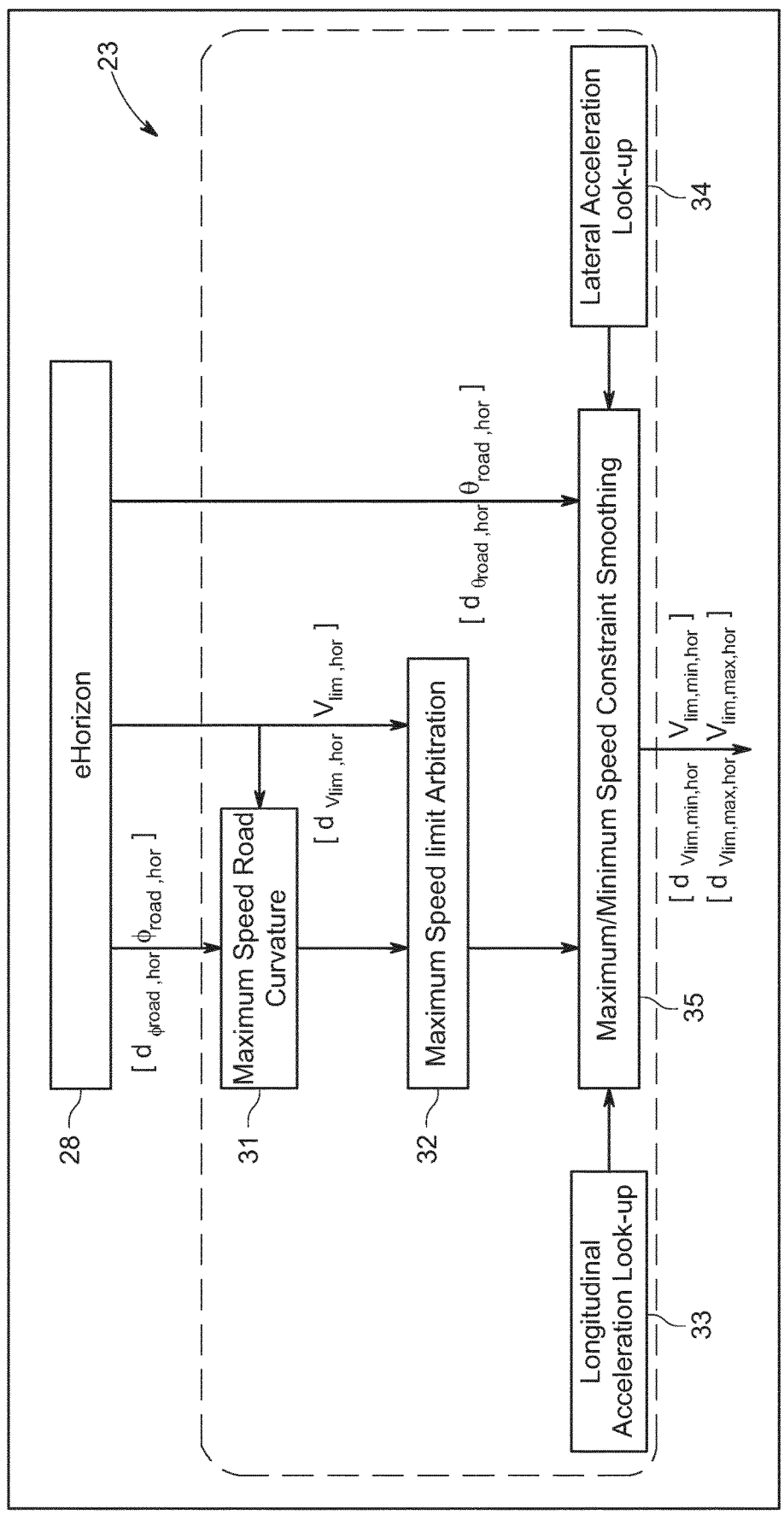
FIG. 5 illustrates the operation of a static speed constraints calculator shown in FIG. 4.

With reference to FIG. 5, the static speed constraints calculator 23 receives the following signals from the route preview calculator 28 in the form of a receding horizon:

A road gradient array $\theta_{road,vec}=[d_{\theta_{road,hor}} \; \theta_{road,hor}]$ comprising the road grade angle vector $\theta_{road,hor}$ at the corresponding distance vector $d_{\theta_{road,hor}}$.

A road curvature array $[d_{\varphi_{road,hor}} \; \varphi_{road,hor}]$ comprising the road curvature angle vector $\theta_{road,hor}$ at the corresponding distance vector $\varphi_{road,hor}$.

A speed limit array $[\theta_{v_{lim,hor}} \; V_{lim,hor}]$ comprising the road speed limit vector $V_{lim, hor}$ at the corresponding distance vector $d_{v_{lim,hor}}$.

The static speed constraints calculator 23 comprises a maximum speed road curvature module 31, a maximum speed limit arbitration module 32, a longitudinal acceleration look-up module 33, a lateral acceleration look-up module 34 and a speed constraint smoothing module 35. The speed constraint smoothing module 35 receives the outputs from the route preview calculator 28, the speed limit arbitration module 32, the longitudinal acceleration look-up module 33 and the lateral acceleration look-up module 34 and generates maximum and minimum speed constraints $V_{lim,max,hor}, V_{lim,min,hor}$. The speed constraint smoothing module 35 outputs the following arrays:

A minimum speed array $[d_{V_{lim,min,hor}} \; V_{lim,min,hor}]$ comprising the minimum speed constraint $V_{lim,min,hor}$ at the corresponding distance vector $d_{V_{lim,min,hor}}$.

A maximum speed array $[d_{V_{lim,max,hor}} \; V_{lim,max,hor}]$ comprising the maximum speed constraint $V_{lim,max,hor}$ at the corresponding distance vector $d_{V_{lim,max,hor}}$.

The maximum speed road curvature module 31 calculates a speed limit due to lateral acceleration exerted on the host vehicle 1 when travelling around a bend in a road (the curvature of the bend being determined with reference to geographical map data). The maximum speed constraint is identified as the smaller of the speed determined by the maximum speed limit arbitration module 32 and the maximum speed road curvature module 31. Subsequently, the speed constraint smoothing module 35 smooths the maximum speed limit according to lateral and longitudinal acceleration target look-up tables defined by the longitudinal and lateral acceleration look-up modules 33, 34. The smoothing module may also consider the road gradient. The minimum speed constraint may be derived as a percentage of the equivalent maximum speed constraint, but also considering the actual vehicle speed (so that optimization is not constrained into an infeasible region). Alternatively, or in addition, functional road class or road type can also be considered in the determination of the lowest speed. As shown in FIG. 4, the minimum speed array $[d_{V_{lim,min,hor}} V_{lim,min,hor}]$ and the maximum speed array $[d_{V_{lim,max,hor}} V_{lim,max,hor}]$ are output to the vehicle speed control unit 20.

Leading Vehicle Velocity Trajectory Prediction

Figure 6:
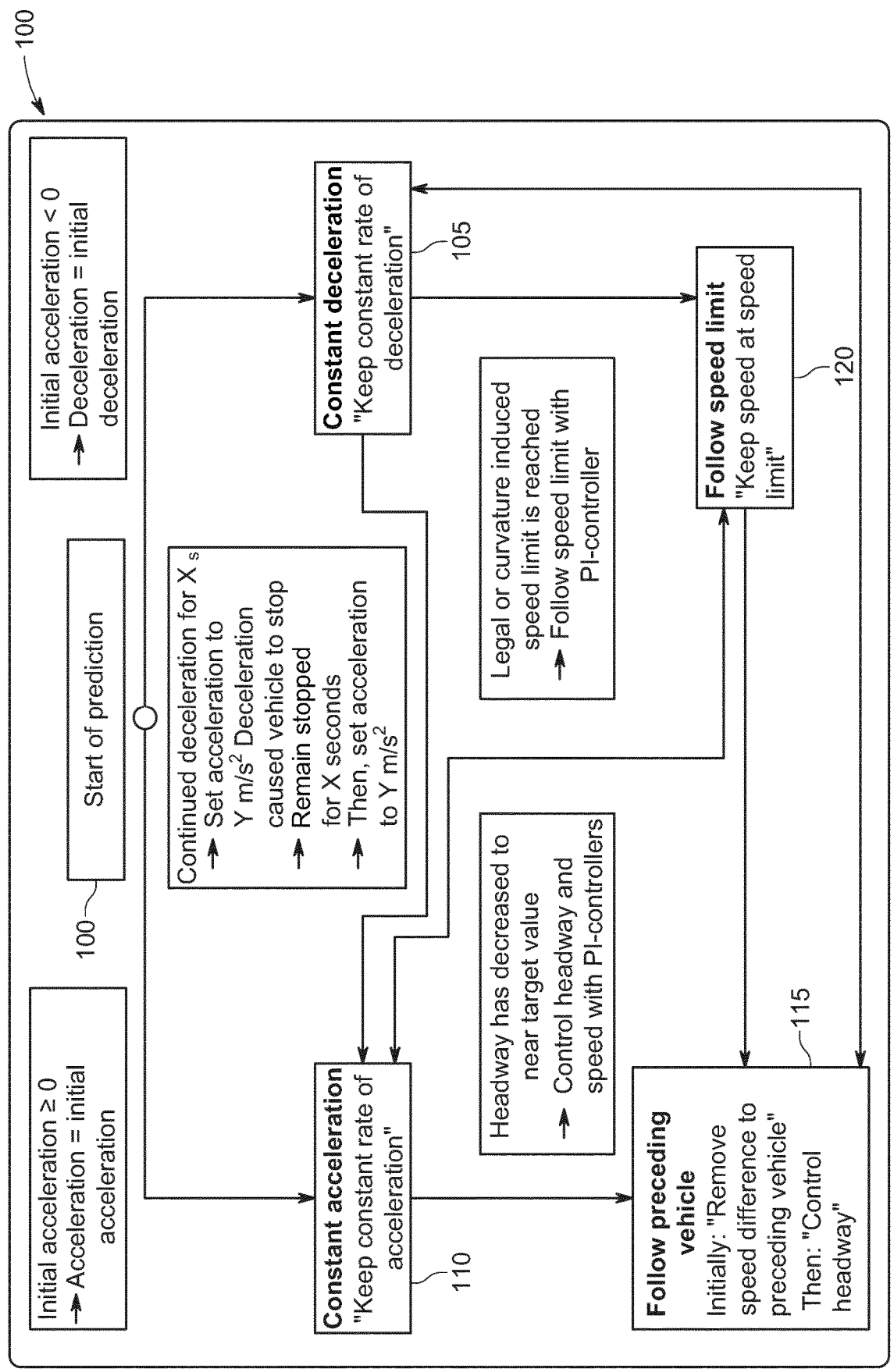
FIG. 6 illustrates a rule-based model for predicting the speed of a target vehicle.

The target vehicle speed trajectory predictor 25 is configured to predict the speed of any target vehicles 15-$n$ in the vicinity of the host vehicle 1, particularly any target vehicles 15-$n$ which may hinder or obstruct the motion of the host vehicle 1 along the route R. The current state of the target vehicles 15-$n$ is transmitted to the host vehicle 1 as part of the V2V communication. Typical information available from the V2V communication includes the current speed, acceleration and location of the target vehicle 15-$n$. A rule-based model for predicting the speed of a target vehicle 15-$n$ is illustrated in FIG. 6. The prediction is conducted for each target vehicle 15-$n$, one target vehicle 15-$n$ at a time, within an optimization horizon of the host vehicle 1 along the route R. The optimization horizon may consist of a sub-section of the route R, the optimization horizon continually changing as the host vehicle 1 progresses along the route R (providing a rolling horizon). The optimization horizon may, for example, comprise a sub-section of the route R having a length greater than or equal to 250 m, 500 m, 750, or 1,000 m. Alternatively, the optimization horizon may consist of the entire route R. The algorithm starts with the target vehicle 15-$n$ the furthest away from the host vehicle 1 and progresses with target vehicle 15-$n$ closer to the host vehicle 1. The prediction of the speed of each target vehicle 15-$n$ assumes that an initial rate of acceleration or deceleration continues for a predetermined period of time.

A model for predicting the speed of a first target vehicle 15-1 is shown in FIG. 6. The model is initiated (BLOCK 100). In the case of an initial deceleration, the prediction assumes the first target vehicle 15-1 will continue to decelerate at a constant rate of deceleration for a predetermined period of time (BLOCK 105). The predetermined period of time for deceleration of the first target vehicle 15-1 is calibratable. A more accurate prediction may be achieved by assuming that the deceleration will end after a few seconds, rather than assuming that the vehicle will continue to decelerate until it comes to a standstill. After an initial period of deceleration, the first target vehicle 15-1 may be assumed to start accelerating again. If the first target vehicle 15-1 is determined to have stopped, an assumption is made that it will remain stationary for a predetermined period of time and will then accelerate at a predetermined acceleration. The period of time that the first target vehicle 15-1 remains stationary is calibratable, as too is the acceleration. In the case of an initial acceleration, the prediction assumes that the first target vehicle 15-1 will continue to accelerate for a predetermined period of time (BLOCK 110). The predetermined period of time for acceleration of the first target vehicle 15-1 is calibratable. The controller 2 may change the predicted movement of the host vehicle 1 in response to a change in the environment. For example, the prediction model would transition from assuming the continued acceleration of the first target vehicle 15-1 if the first target vehicle 15-1 is identified as following a second target vehicle 15-2, i.e. a preceding vehicle (BLOCK 115). This change may, for example, be implemented upon determining that the first target vehicle 15-1 is within a predefined distance of the second target vehicle 15-2. The prediction model assumes that the first target vehicle 15-1 will subsequently attempt to keep a certain headway between the first target vehicle 15-1 and the second target vehicle 15-2. The model may define a target headway distance between the first target vehicle 15-1 and the second target vehicle 15-2. Another possibility is that the initial acceleration or deceleration results in the speed of the first target vehicle 15-1 being substantially equal to a determined speed limit (either a legal speed limit or a speed limit determined by road curvature) in which case the prediction would assume that the first target vehicle 15-1 would proceed at the speed limit (BLOCK 120). If the first target vehicle 15-1 gets close to the second target vehicle 15-2, the predicted speed of the first target vehicle 15-1 is reduced. Note that there is no possible transition from the first target vehicle 15-1 following the second target vehicle 15-2 to following the speed limits. This is because the prediction would never predict any of the target vehicles 15-$n$ as exceeding the speed limit (at least for longer than momentarily e.g. when speed limit is decreasing), nor would it try to predict any overtaking. Consequently, a large gap between the first target vehicle 15-1 and the second target vehicle 15-2 cannot develop and thus this transition is not necessary. The prediction model could be modified also to take into account infrastructure, for example traffic control signals. It will be understood that the prediction model may be updated cyclically when new information is available regarding the position and/or movements of the target vehicles 15-$n$. The prediction model predicts the speed and movement of each of the identified target vehicles 15-$n$. Other techniques for modelling the speed and movement of the target vehicles 15-$n$ may be used.

Optimization Algorithm Formulation

Problem Formulation and Decomposition

The determination of an appropriate vehicle speed trajectory and the control of the vehicle propulsion system is dependent on a plurality of states/inputs and time-variant, nonlinear system dynamics. The controller 2 utilises the following states and inputs:

$$\text{State: } x = [t \; V_{veh} \; SOC \; \kappa_{gr}] \tag{33}$$

$$\text{Control input: } u = [a_{veh} u_1 u_2 u_3] \tag{34}$$

$$\text{Ex. input: } \omega_k = [E_{dcdc,est} \theta_{road,vec} T_{ice} T_{HV} c_{F_rl}] \tag{35}$$

where $t$, $E_{dcdc,est}$, $T_{ice}$, $T_{HV}$, and $c_{F_{rl}}$ denote time, an estimate of auxiliary energy consumption, ICE coolant temperature, HV battery temperature and the road-load force coefficients (at zero road gradient), respectively within the optimization horizon. The front axle transmission input $u_3$ is defined as:

$$u_3 = \begin{cases} 1, & \text{gear upshift} \\ 0, & \text{gear hold} \\ -1, & \text{gear downshift} \end{cases} \tag{36}$$

A level of approximation is appropriate. One option would be to linearize the system (as defined in Equation 24) and make various approximations to the constraints (as defined in Equations 25 to 29). This option is not implemented in the present embodiment. An alternative would be to sacrifice a level of optimality, using an approximate Nonlinear Model Predictive Controller algorithm (NMPC). As outlined above, the dynamic programming algorithm has been implemented in the present embodiment. In order to reduce the computational burden of the dynamic programming algorithm, the optimization problem is decomposed into two stages, as represented by the vehicle speed control unit 20 and the hybrid powertrain control unit 21 in FIG. 4. The vehicle speed control unit 20 and the hybrid powertrain control unit 21 will now be described in more detail.

Vehicle Speed Optimization

The vehicle speed control unit 20 receives the following:

Static speed constraints from function: Static Speed Constraints Calculation.

Time-varying speed constraints from function: Surrounding Vehicle Speed Trajectory Predictor.

Time-repeatable speed constraints from the V2I communication channel. This includes the green and red phasing of the traffic control signals.

The current vehicle speed (as initial condition) and SOC.

The array $\theta_{road,vec}$ and the road-load force coefficients $c_{F_{rl}}$.

Setting aside the time variant derived from the V2X communication, the dynamic programming problem cost can be defined as follows:

$$g_k(x_k, u_k, \omega_k) = W_{time} t + W_{acc} a_{veh}^2 + W_{road} F_{road} \quad (37)$$

with

State: $x_k = V_{veh}$ (38)

Control input: $u_k = a_{veh}$ (39)

Exogenous input: $\omega_k = [\theta_{road,vec} \ c_{F_{rl}}]$ (40)

where $W_{time}$, $W_{acc}$, and $W_{road}$ are the cost weights for time term t, the square acceleration term $a_{veh}^2$, and the road-load force term $F_{road} = F_r + F_a + F_g$, respectively. A distance-based grid is adopted. The $W_{time}$, $W_{acc}$, $W_{road}$ reflect the relative importance of each term. The acceleration term is used to avoid aggressive (de)accelerations. $W_{acc}$ could be a function of SOC, i.e. $W_{acc} = f$ (SOC) and predicted recuperation energy, to adapt the level of acceleration or deceleration according to the powertrain state. The time term is used to discourage input mode transitions which add significant time to the journey. Finally, the road-load term discourages excessively high vehicle cruising, as aerodynamic losses exponentially increase with vehicle speed. The time during a mode transition is calculated starting from the following equations:

$$\frac{1}{2} a_{veh, D_s} t_{D_s}^2 + v_{start, D_s} t_{D_s} = D_s \quad (41)$$

$$v_{start, D_s} = v_{end, D_s} - a_{veh, D_s} t_{D_s} \quad (42)$$

where $a_{veh,D_s}$ is acceleration used during distance step $D_s$, $t_{D_s}$ is the time spent to cover distance step $D_s$, $v_{start,D_s}$ is the vehicle speed at the beginning of the distance step, and $v_{end,D_s}$ the vehicle speed at the end of the distance step.

The vehicle speed at the end of the distance step $v_{end,D_s}$ and the acceleration during the distance step $a_{veh,D_s}$ are known based on the model inputs. The distance step $D_s$ is also known based on the optimization problem definition. The vehicle speed at the beginning of the distance step $v_{start,D_s}$ (model output state in forward dynamic programming) and the time to cover the distance step $t_{D_s}$ can be calculated. The time spent to cover the distance step $t_{D_s}$ is required for time-keeping and cost calculation. The vehicle speed at the beginning of the distance step $v_{start,D_s}$ is obtained directly from Equation (42); and the time to cover the distance step $t_{D_s}$ can be obtained by substituting Equation (42) into Equation (41). This results in the following second order polynomial equation:

$$-\frac{1}{2} a_{veh, D_s} t_{D_s}^2 + v_{end, t_{D_s}} t_{D_s} - D_s = 0 \quad (43)$$

The solution of this quadratic equation is given by:

$$t_{D_s} = \frac{v_{end, D_s} \pm \sqrt{v_{end, D_s}^2 - 2 a_{veh, D_s} D_s}}{a_{veh, D_s}} \quad (44)$$

From the two resulting roots of the equation, the smaller positive non-complex root is selected.

Figure 7A:
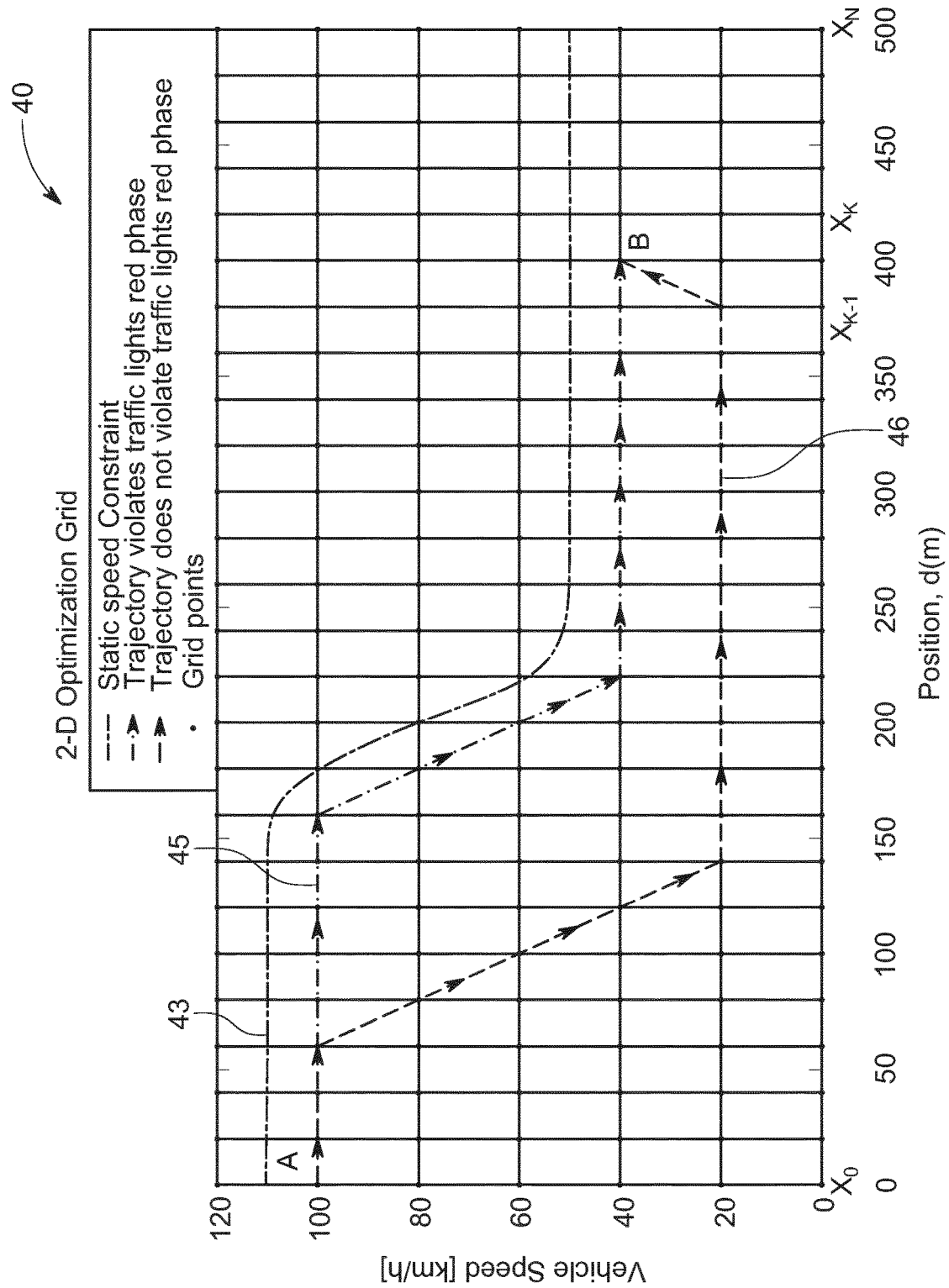
FIG. 7A shows a two-dimensional optimization grid representing speed constraints due to a traffic control signal.
Figure 7B:
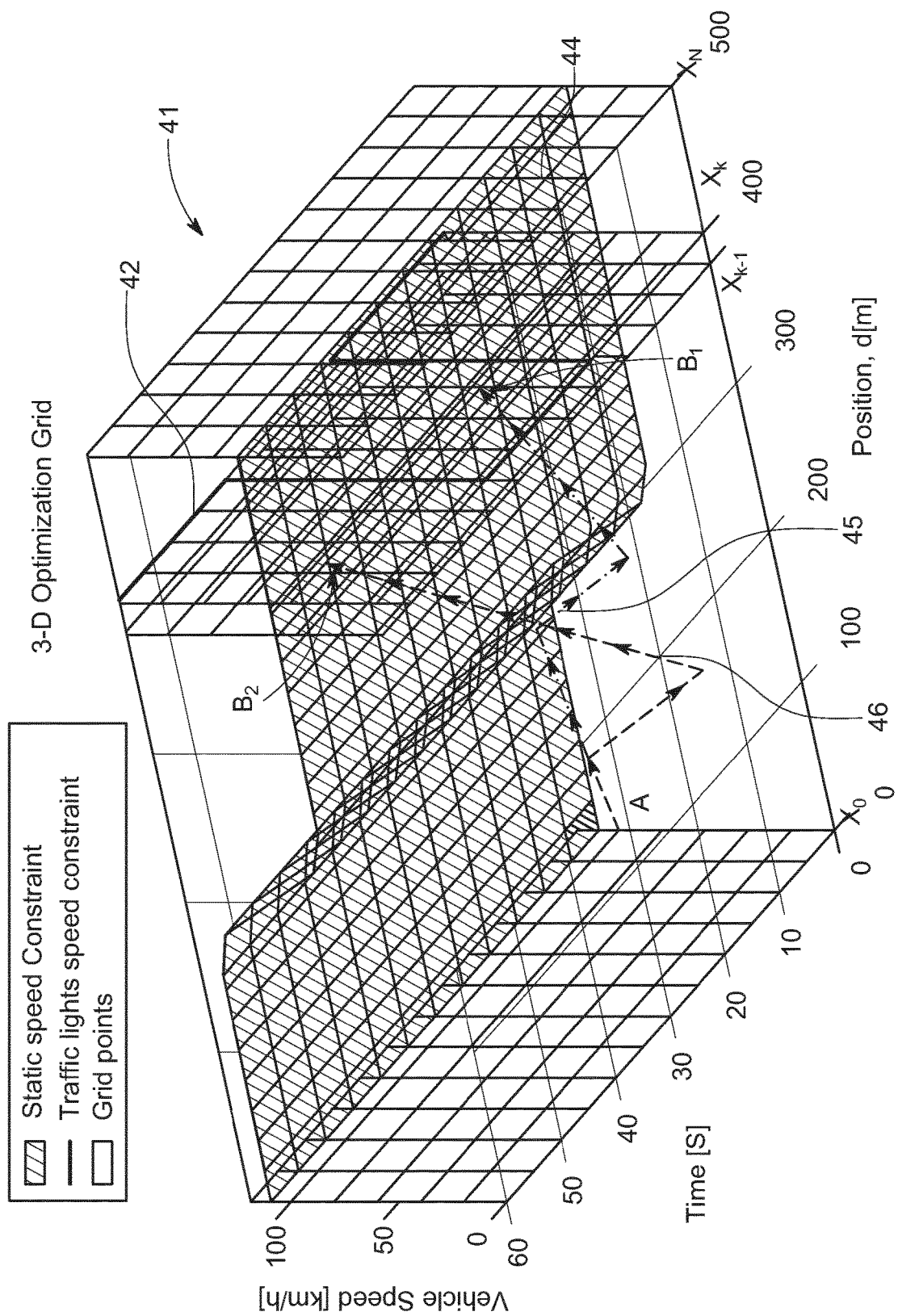
FIG. 7B shows a three-dimensional optimization grid representing speed constraints due to a traffic control signal.

The V2X speed optimization constraints, such as the target vehicles 15-n, the traffic control signals 18-n and other traffic objects, are time-dependent obstacle. A comparison of the static vehicle speed constraint against the speed constraint due to a traffic control signal is represented in a two-dimensional (2D) optimization grid 40 shown in FIG. 7A; and a corresponding three-dimensional (3D) optimization grid 41 shown in FIG. 7B. The two-dimensional (2D) optimization grid 40 consists of a two-dimensional speed against distance map. The three-dimensional (3D) optimization grid 41 consists of a three-dimensional speed, distance and time map. In the illustrated example, a traffic control signals 18-n are located at a position $d_k$=400 m, ahead of a current vehicle position $d_0$=0 m.

The traffic control signals 18-n impose a speed constraint during a red phase when the progress of the host vehicle 1 would be impeded. The traffic control signals 18-n do not impose a speed constraint during a green phase when the progress of the host vehicle 1 would be at least substantially unhindered. The operating state of the traffic control signals 18-n is represented in the 3D optimization grid 41 by a square wave 42 having a non-zero value during the red phase and a zero value during the green phase. In the illustrated arrangement, the red phase of the traffic control signals 18-n has a duration of 20 to 40 seconds. A static speed constraint due to road topology/speed limits is represented by a first continuous line 43 in the 2D optimization grid 40, and by a continuous surface 44 within the 3D optimization grid 41. The host vehicle 1 is travelling with an initial speed $V_{veh,0}$=100 km/h. The grid points $X_0$, $X_{k-1}$, $X_k$, and $X_N$ represent analysis planes at distance $d_0$=0 m, $d_{k-1}$, $d_k$, and $d_N$=500 m, respectively. In the 2D optimization grid 40, potential first and second trajectories 45, 46 from point A to point B are shown. The first and second speed trajectories 45, 46 are also shown in the 3-D optimization grid 41. The first and second speed trajectories 45, 46 end at points $B_1$, $B_2$ respectively in the 3-D optimization grid 41. The first trajectory 45 is valid since it results in the host vehicle 1 traversing the location of the traffic control signals 18-n during a green phase. The second trajectory 46 is invalid since it results in the host vehicle 1 traversing the location of the traffic control signals 18-$n$ during a red phase. Thus, only the first trajectory 45 (extending from A to $B_2$) is feasible with regards to traffic control signal constraints.

If the analysis is performed within a 2-D plane, the time-varying speed constraints would only be considered during the transition from $X_{k-1}$ to $X_k$ in a forward dynamic programming optimization. Considering the time-varying speed constraint at $d_k$, the already calculated optimized trajectories, from any grid point of $X_0$ to $X_{k-1}$ in the 2-D optimization grid 40 may no longer be optimal, or may be infeasible during the transition from $X_{k-1}$ to $X_k$. To overcome this problem, the optimization space could be increased also to include time as an optimization state. However, this exponentially increases the possible transitions from grid plane $X_0$ to $X_k$ and significantly increases computational burden.

An alternative problem formulation may utilise an approximation that avoids the need to add time as an optimization state. A separate cost function is added to the dynamic programming algorithm to penalize control actions that are likely to have undesired time trajectories. A level of optimality is potentially sacrificed using this approach, but it is believed that any such loss is acceptable, for example compared to uncertainty arising from traffic flow predictions. Conversely, the proposed solution further discourages frequent fluctuations in vehicle speed that may otherwise have been selected. By way of example, cost considerations can be added for traffic control signals 18-$n$ and target vehicles 15-$n$. The dynamic programming algorithm is calculated forwards, i.e. from the current time at the beginning of algorithm execution, to determine whether or not time-variant constraints, such as the traffic control signal 18-$n$, will be violated (i.e. whether or not one or more traffic control signal 18-$n$ on the route R will impede progress of the host vehicle 1).

The operation of the controller 2 will now be described in relation to a scenario illustrated in FIG. 8 in which the host vehicle 1 is approaching a first traffic control signal 18-1. A two-dimensional optimization grid 50 is generated consisting of a two dimensional speed against distance map. A first traffic control signal 18-$n$ is identified at a first location k on the route R. First and second acceleration limits for the host vehicle 1 are calculated to arrive at the first location K during a time period corresponding to a green phase of the first traffic control signal 18-1 (represented by a double-headed arrow 1 in FIG. 8). The first acceleration limit $a_{OV}$ corresponds to the host vehicle 1 arriving at the first traffic control signal 18-1 concurrent with the beginning of the green phase l, i.e. as the first traffic control signal 18-1 turns green ($a_{TL}^{l,green}$). The first acceleration limit $a_{TL}$ corresponds to a constant acceleration or deceleration that would cause the host vehicle 1 to arrive at the first location K at a first arrival time corresponding to a time when the first traffic control signal 18-1 enters a first green phase. The second acceleration limit corresponds to the host vehicle 1 arriving at the first traffic control signal 18-1 contemporaneous with the end of the green phase l, i.e. as the first traffic control signal 18-1 turns red ($a_{TL}^{l,red}$). The second acceleration limit $a_{TL}$ corresponds to a constant acceleration or deceleration that would cause the host vehicle 1 to arrive at the first location K at a second arrival time corresponding to a time when the first traffic control signal 18-1 exits the first green phase. The first and second acceleration limits $a_{TL}$ are calculated for the host vehicle 1 in respect of each grid point in the 2-D optimization grid 50 between the current position of the host vehicle 1 and the traffic control signal 18-$n$. In the example illustrated in FIG. 8, the first and second acceleration limits $a_{TL}$ are calculated at the grid points $x_0^4$ (corresponding to point A) and grid point $x_{14}^3$; the first and second speed trajectories 51, 52 for each these grid points is illustrated. The first and second acceleration limits define upper and lower speed trajectories 51, 52 for the host vehicle 1. The upper and lower speed trajectories 51, 52 define a target operational speed band 53. A cost is applied for any acceleration transitions that violate the first and second acceleration limits (i.e. a cost is applied if the actual acceleration of the host vehicle 1 is outside the range defined by the first and second acceleration limits). Consequently, the traffic control signal cost could prompt the dynamic programming algorithm to favour lower speed trajectories, for example when a higher speed trajectory will result in the host vehicle 1 arriving at the first traffic control signal 18-1 during a red phase which would necessitate the host vehicle 1 stopping. It will be appreciated that the operation of the first traffic control signal 18-1 is cyclical and the green and red phases alternate, thereby providing a plurality of opportunities for the host vehicle 1 to pass the first traffic control signal 18-1 during a green phase. By way of example, first and second green phases l1, l2 are shown in the two-dimensional optimization grid 50. The first and second acceleration limits $a_{TL}$ may be calculated for a plurality of red phases and/or green phases.

The calculation of the acceleration limit $a_{TL}$ will now be described by way of example. The speed, distance and time are known for a grid point A. At a grid point C corresponding to the traffic control signal 18-1 transitioning to the green phase, the distance and time are known, but the speed of the host vehicle 1 is not known. By way of example, at the grid point A the first speed (Sp1) of the host vehicle 1 is 100 kph (27.8 m/s), the first distance (d1) is zero (0) metres and the first time (time1) is zero (0). At the grid point C, the second speed (Sp2) of the host vehicle 1 is unknown, the second distance (d2) is 400 metres and the second time (time2) is 20 seconds. The following kinematic equations can be used to determine the acceleration limit $a_{TL}$ and the second speed (Sp2):

$Sp2=SP1+\text{alim}\times(\text{time2}-\text{time1})$ $d2-d1=(\text{time2}-\text{time1})*(Sp2+Sp1)/2$ One of the equations is solved for one unknown (either the acceleration limit $a_{TL}$ or the second speed (Sp2)) and the result substituted in the other equation.

Figure 8:
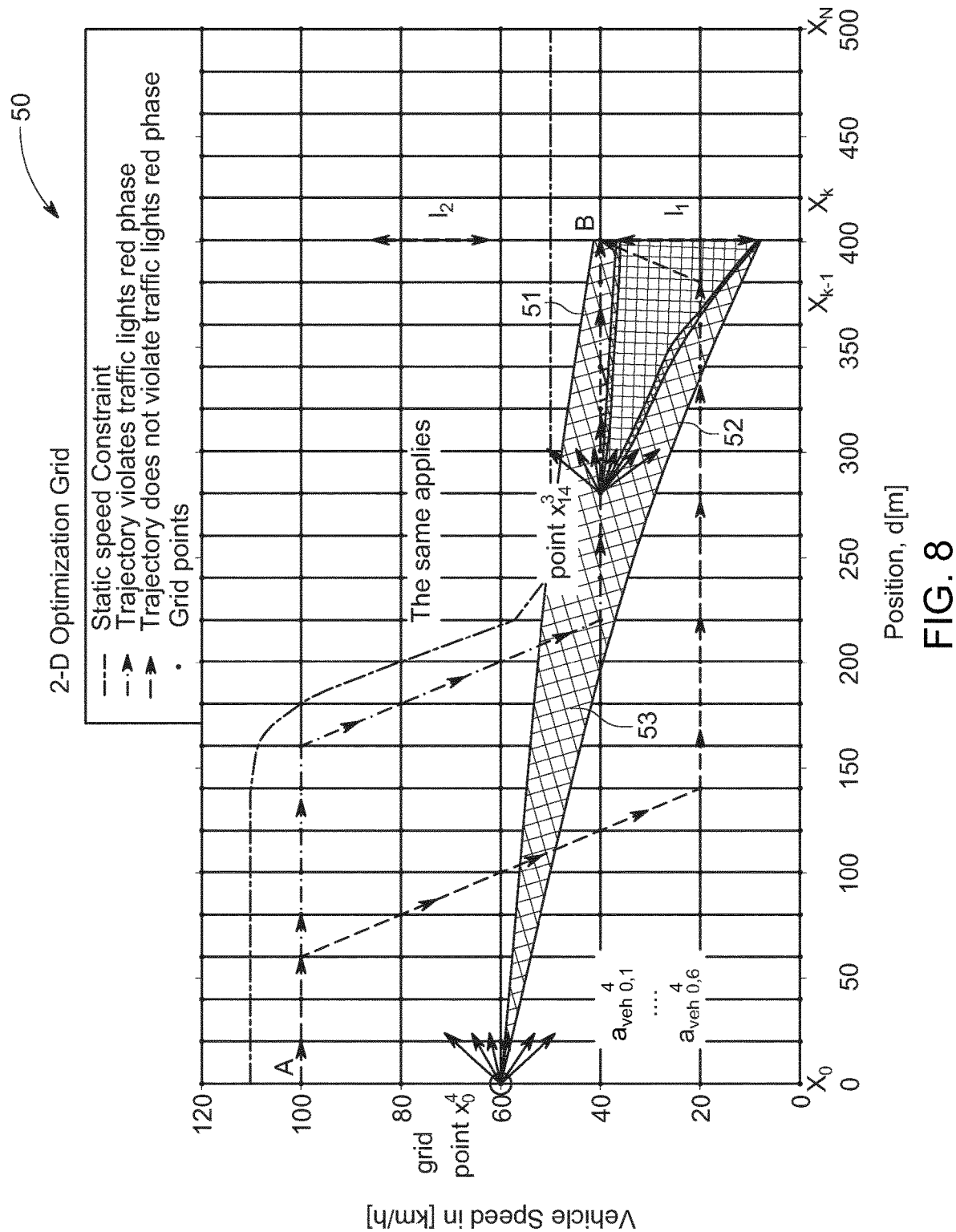
FIG. 8 shows a two-dimensional optimization grid for determining a target operational speed band associated with a traffic control signal.

In the arrangement illustrated in FIG. 8, a lower static optimisation limit is set (20 kph in the present example), but this is not essential. As the host vehicle 1 moves forward along the route R, the cost function is evaluated for each possible acceleration action. Each action is associated with a time interval (see equation 44). By adding the time interval for a given speed trajectory, the processor 12 determines whether each speed trajectory will result in the host vehicle 1 passing through the traffic control signal 18-1 during a green phase or a red phase. If the speed trajectory remains within the operational speed band 53 defined by the upper and lower speed trajectories 51, 52, the host vehicle 1 will pass through the traffic control signal 18-1 during a green phase.

It will be understood that there may be a single traffic control signals 18-$n$ on the route R, or there may be a plurality of traffic control signals 18-$n$ on the route R. The following control strategy is used to determine the cost related to the one or more traffic control signal 18-$n$ located within the optimization horizon on the route R:

1. For each traffic control signal 18-*n* within the optimization horizon and its each green phase compute $a_{TL}^{l,green}$ and $a_{TL}^{l,red}$.
2. For each transition that does not fall within a green phase, compute violation to closest limit $a_{viol} = |a_{veh} - a_{TL}^{lim}|$.
3. Add cost to these violating transitions $$g_{TL} = \frac{a_{viol} WTL_1}{a_{rem,TL}^{WTL_2}(1 + M_{TL} WTL_3)}.$$

The cost function $g_{TL}$ increases the associated cost as the violation $a_{viol}$ increases, the cost decreases as the distance remaining to the traffic control signal $d_{rem,TL}$ increases and as the number of traffic control signals between the currently considered traffic control signal and the host vehicle 1 $M_{TL}$ increases. The weightings of these different considerations can be tuned with the following coefficients: $WTL_1 \in (0, \infty)$, $WTL_2 \in [0,\infty)$ and $WTL_3 \in [0,\infty)$. At least in certain embodiments, the cost related to each traffic control signal 18-*n* decreases as the distance between the host vehicle 1 and the traffic control signal 18-*n* increases.

A similar cost function can be applied with regards a target vehicle 15-*n*, for example to calculate a target speed trajectory band for the host vehicle that avoids approaching a target vehicle 15-*n* in front of the host vehicle 1 with a large speed difference. The progress of the target vehicle 15-*n* along the route R is predicted, for example utilising the model described herein with reference to FIG. 6. The application of a suitable cost generates a speed profile that results in the host vehicle 1 gradually reducing speed to maintain a target headway between the host vehicle and the target vehicle 15-*n*. At least in certain embodiments, a gradual approach to the target vehicle 15-*n* may be more energy efficient as it allows increased coasting and mitigates the need to use friction brakes. This can be done by first making a prediction of the speed of the target vehicle(s) 15-*n* within the optimization horizon. This prediction is used in a cost function to compute how each transition would affect the headway between the host vehicle 1 and the target vehicle 15-*n*. The target vehicle 15-*n* is identified at a first location K and the speed of the target vehicle 15-*n* determined at the first location K. The target vehicle 15-*n* in the present embodiment is assumed to be travelling at a constant speed for the purposes of predicting its movement along the route R. A first acceleration limit $a_{OV}$ is calculated for the host vehicle 1. It will be understood that other techniques may be implemented to model movement of the target vehicle 15-*n*, for example comprising acceleration/deceleration and/or local infrastructure, such as traffic control signals. The first acceleration limit $a_{OV}$ defines a constant acceleration or deceleration for the host vehicle 1 which will result in the host vehicle 1 arriving at the first location K at a first arrival time with a vehicle speed which is substantially equal to or less than the speed of the target vehicle 15-*n* at the first location K. The first arrival time is selected to provide a target headway between the host vehicle 1 and the target vehicle 15-*n* when the host vehicle 1 arrives at the first location K. The first acceleration limit is calculated for the host vehicle 1 in respect of each grid point in a 2-D optimization grid. The acceleration limit is used to determine a target operational speed band for the host vehicle 1. If the first acceleration limit is violated (i.e. the actual acceleration of the host vehicle 1 differs from the first acceleration limit), a cost is applied to the optimized speed profile. In the present embodiment, if the deceleration of the host vehicle 1 is less than the acceleration limit $a_{OV}$, a cost is applied as the host vehicle 1 will arrive at the first location K with a higher speed than that of the target vehicle 15-*n*). If the acceleration of the host vehicle 1 is greater than or equal to the acceleration limit $a_{OV}$, no cost is applied as the host vehicle 1 will approach the target vehicle 15-*n* gradually with a smaller speed differential, thereby reducing or avoiding harsh or reactive deceleration.

A control strategy to determine the cost related to the target vehicle 15-*n* (referred to herein as the target vehicle cost $g_{OV}$) is as follows:

1. Compute an acceleration $a_{OV}$ and distance vector $d_{rem,hw,min}$ for the target vehicle 15-*n*.
2. For each transition, compute violation of the acceleration limit $a_{viol} = |a_{veh} - a_{OV}|$.
3. Add target vehicle cost $g_{OV} = 0$ to each violating transition:

$$g_{OV} = \left(1 - \frac{a_{rem,hw,min}}{a_{hw,pen,max}}\right) WOV_1 a_{viol}.$$

4. Set the target vehicle cost $g_{OV} = 0$ when distance to minimum headway is large: $d_{rem,hw,min} > d_{hw,pen,max}$ or if $a_{veh} < a_{OV}$.

In this scenario, the target vehicle cost $g_{OV}$ is the cost associated with the target vehicle 15-*n*, $d_{rem,hw,min}$ is the distance from the minimum headway to the other vehicle, $d_{hw,pen,max}$ is the distance beyond which no penalties related to the target vehicle 15-*n* are applied, and $WOV_1 \in [0,\infty)$ is a penalty coefficient determining the overall importance of the target vehicle cost $g_{OV}$. The target vehicle cost $g_{OV}$ decreases as the distance between the host vehicle 1 and the target vehicle 15-*n* increases.

The overall speed optimization cost function $g_k(x_k, u_k, \omega_k)$ can now be augmented with the traffic control signal cost $g_{TL}$ and the target vehicle cost $g_{OV}$:

$$g_k(x_k, u_k, \omega_k) = W_{time} t + W_{acc} a_{veh}^2 + W_{road} F_{road} + g_{TL} + g_{OV} \quad (45)$$

Figure 9:
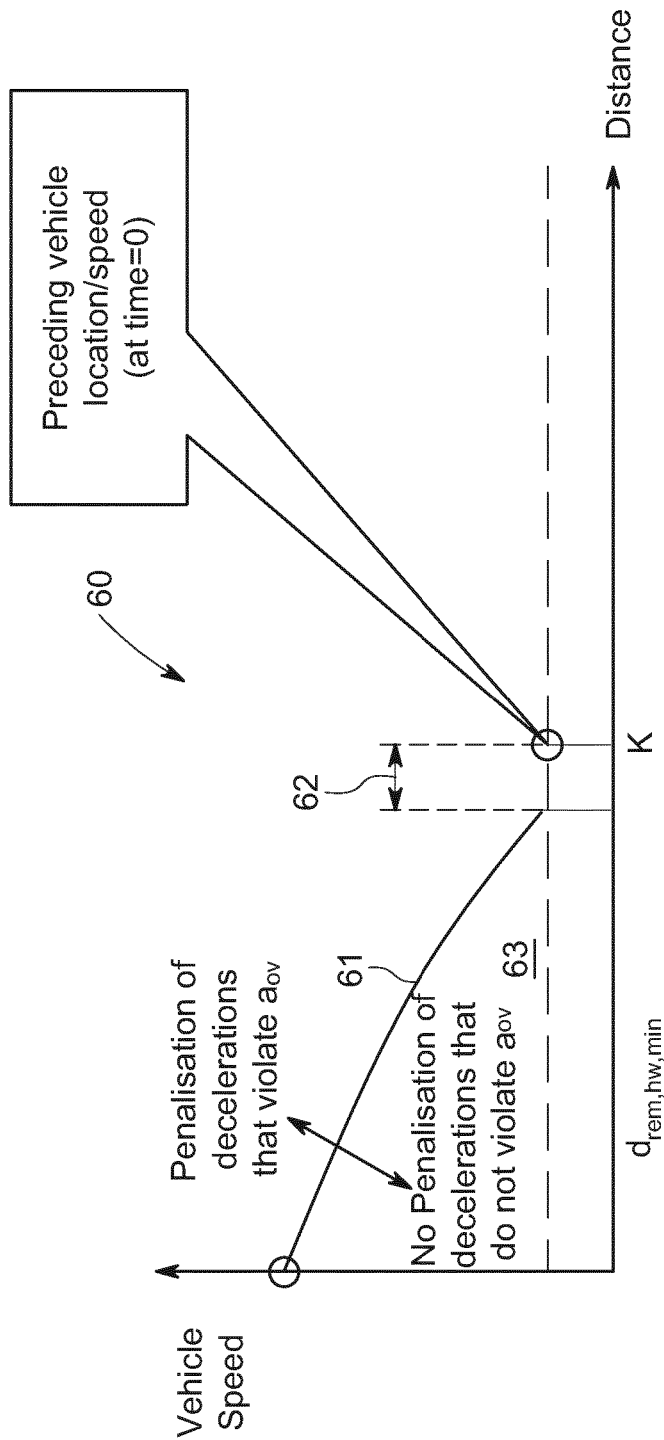
FIG. 9 shows a two-dimensional optimization grid for determining a target operational speed band associated with a target vehicle in a first scenario.

The operation of the controller 2 will now be described in relation to first lead vehicle scenario illustrated in FIG. 9. The host vehicle 1 is approaching from behind a first target vehicle 15-1 which is travelling along the route R. A two-dimensional optimization grid 60 is generated consisting of a two dimensional speed against distance map. The two-dimensional optimization grid 60 relates a distance from the host vehicle 1 along the route R to the speed of the host vehicle 1. The first target vehicle 15-1 is identified at a first location K on the route R. The progress of the first target vehicle 15-1 along the route R is predicted assuming at a constant speed (for example determined via V2V communication or using on-board sensors on the host vehicle 1). A first acceleration limit $a_{OV}$ is calculated for the host vehicle 1 to determine a first speed trajectory 61 for controlling the host vehicle 1 to arrive at the first location K at a speed which is less than or equal to the determined speed of the first target vehicle 15-1. The first acceleration limit $a_{OV}$ corresponds to a constant acceleration or deceleration that would cause the host vehicle 1 to arrive at the first location K at a first arrival time with a vehicle speed which is substantially equal to or less than the speed of the target vehicle 15-*n* at the first location K. The first arrival time is selected to provide a target headway 62 between the host vehicle 1 and the target vehicle 15-*n* when the host vehicle 1 arrives at the first location K. In the arrangement illustrated in FIG. 9, this is implemented by calculating the first acceleration limit $a_{OV}$ for a position which is offset relative to the first location K y a distance corresponding to a target headway 62. The first acceleration limit $a_{OV}$ is calculated at each grid point in the two-dimensional optimization grid 60. A cost is applied based on a deviation of the actual acceleration of the host vehicle 1 from the acceleration limit $a_{OV}$. The cost is determined in dependence on the magnitude of the deviation. An acceleration of the host vehicle 1 which is greater than the acceleration limit $a_{OV}$ is penalised. The distance vector $d_{rem,hw,min}$ directly affects the cost. By way of example, the initial speed of the host vehicle 1 may be 50 km/h and the first target vehicle 15-1 may have a constant speed of 20 km/h. At the starting position, the acceleration limit $a_{OV}$ corresponds to a constant deceleration that would cause the host vehicle 1 to slow down from 50 km/h to 20 km/h while moving to the initial position of the first target vehicle 15-1. As illustrated in FIG. 9, the headway 62 is maintained between the host vehicle 1 and the first target vehicle 15-1 as a safety consideration. As speeds of the host vehicle 1 and the first target vehicle 15-1 are at least substantially equal to each other, the headway 62 remains constant. In order to avoid an unnecessarily large headway 62, a small violation of the acceleration limit $a_{OV}$ may be permitted. Thus, no cost may be applied for a deceleration of the host vehicle 1 which is lower than the acceleration limit $a_{OV}$ within a predetermined margin, for example expressed as a proportion of the acceleration limit $a_{OV}$. The dynamic programming algorithm may flag any trajectory as infeasible which would result in the host vehicle 1 getting closer to the first target vehicle 15-1 than a predetermined minimum headway. In this example, the first speed trajectory 61 defines an upper limit of a target operational speed trajectory band 63. The operational speed trajectory band 63 is the area below the first speed trajectory 61 shown in FIG. 9. Other static constraints could be applied to reduce the target speed trajectory band.

Figure 10:
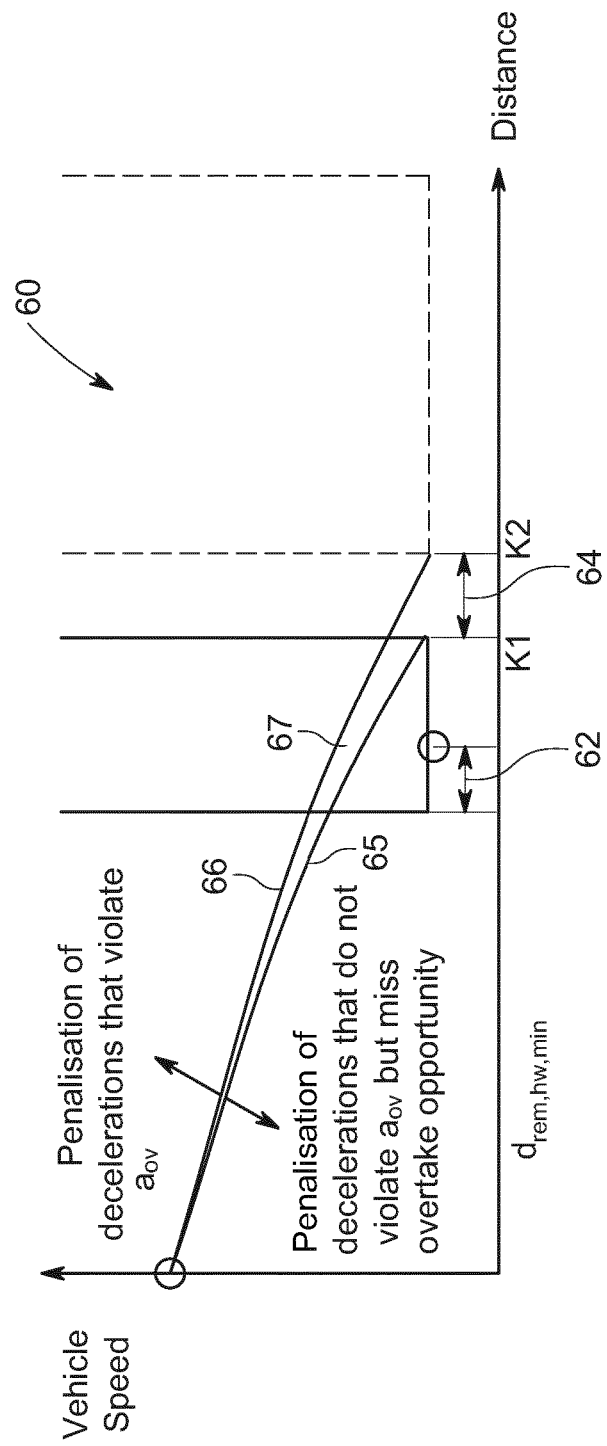
FIG. 10 shows a two-dimensional optimization grid for determining a target operational speed band associated with a target vehicle in a second scenario.

The first target vehicle 15-1 may hinder or impede progress of the host vehicle 1 depending on the location on the route R where the host vehicle 1 encounters the first target vehicle 15-1. For example, the host vehicle 1 may be hindered if the first target vehicle 15-1 is encountered on a section of road which is favourable for performing unfavourable for performing an overtaking manoeuvre, for example a section of road having a single lane or where overtaking is not permitted. Conversely, the host vehicle 1 may continue substantially unhindered if the first target vehicle 15-1 is encountered on a section of road which is favourable for performing an overtaking manoeuvre, for example a section of road or highway having multiple lanes. The operation of the controller 2 will now be described in relation to second lead vehicle scenario illustrated in FIG. 10. The controller 2 is configured to identify an overtaking opportunity 64, for example corresponding to a section of the route R favourable for performing an overtaking manoeuvre. As illustrated in FIG. 10, the overtaking opportunity 64 may be defined in the two-dimensional optimization grid 60 as extending over a predetermined distance relative to the current location of the host vehicle 1. The overtaking opportunity 64 is identified as extending between a first location K1 and a second location K2 (represented in the two-dimensional optimization grid 60 as respective first and second distances relative to the current location of the host vehicle 1). A first acceleration limit $a_{OV}$ is used to determine a first speed trajectory 65 to control the host vehicle 1 to arrive at the first location K1 at a first arrival time which is the same as or later than the time that the first target vehicle 15-1 will arrive at the first location K1. A second acceleration limit $a_{OV}$ is used to determine a second speed trajectory 66 to control the host vehicle 1 to arrive at the second location K2 at a second arrival time which is the same as or before the time that the first target vehicle 15-1 will arrive at the second location K2. The first and second acceleration limit $a_{OV}$ define a constant acceleration or deceleration for the host vehicle 1. The first and second acceleration limits $a_{OV}$ are calculated at each grid point in the two-dimensional optimization grid 60. The first and second speed trajectories 65, 66 define a target operational speed band 67 for the host vehicle 1. As shown in FIG. 10, the target operational speed band 67 is bounded by the first and second speed trajectories 65, 66. A cost is applied for any acceleration transitions that violate the first and second acceleration limits $a_{OV}$. The traffic control signal cost could prompt the dynamic programming algorithm to apply a bias in favour of a lower speed trajectory, for example when a higher speed trajectory will result in the host vehicle 1 approaching the first target vehicle 15-1 before the identified overtaking opportunity 64. Conversely, the traffic control signal cost could prompt the dynamic programming algorithm to apply a bias in favour of a higher speed trajectory, for example when a lower speed trajectory will result in the host vehicle 1 approaching the first target vehicle 15-1 after the identified overtaking opportunity 64. The processor 12 determines that the target vehicle 15-1 is not relevant if the overtake opportunity is taken, but continues to monitor the target vehicle 15-1 if the overtaking opportunity is missed.

Rather than an overtaking opportunity 64, the route R may comprise an intersection and the processor 12 may determine that the host vehicle 1 will encounter the first target vehicle 15-1 at the intersection. Again, the time that the host vehicle 1 arrives at and/or exits the intersection may determine whether progress is hindered by the first target vehicle 15-1.

Hybrid Powertrain Optimization

The operation of the hybrid powertrain control unit 21 will now be described. The hybrid powertrain control unit 21 receives:

The array $[d_{V_{veh,opt,hor}} V_{veh,opt,hor}]$ which contains optimized vehicle trajectory $V_{veh,opt,hor}$ at the corresponding distance vector $d_{V_{veh,opt,hor}}$.

The array $\theta_{road,vec}$, the road-load force coefficients $c_{F_{ri}}$, and an estimate of auxiliary consumer energy $E_{dcdc,est}$, in order to account for them in the optimization.

The current SOC of the traction battery 6 to set the optimization initial condition.

The array $[d_{SOC} SOC_{target}]$ which contains the SOC target $SOC_{target}$ at the corresponding distance vector $d_{SOC}$.

The cost function for the powertrain hybrid optimization is set as:

$$g_k(x_k,u_k,\omega_k)=W_f \dot{m}_f+W_{SOC}|SOC_{trgt}-SOC|+W_{u_3}|u_3| \quad (46)$$

with

State: $x_k=[SOC \; \kappa_{gr}]^T$ (47)

Control input: $u_k=[u_1 u_2 u_3]^T$ (48)

Ex. input: $\omega_k=[E_{dcdc,est} \; \theta_{road,vec} \; T_{ice} \; T_{HV} \; c_{F_{ri}}]$ (49)

where $W_f$, $W_{SOC}$, and $W_{u_3}$ are the cost weights associated with the fuel economy, SOC and gear cost terms. The SOC term is introduced to ensure the SOC is sustained, and for more flexibility could be adaptable to SOC and $SOC_{trgt}$, i.e. $W_{SOC}=f_{soc}(SOC,SOC_{trgt})$. $SOC_{trgt}$ is provided by the route-based predictive optimizer. The gear cost term $W_{u_3}$ is applied to discourage frequent gear shifts.

The vehicle speed control unit 20 determines the target operational speed band 67 in dependence on the upper and lower speed trajectories 65, 66. The target operational speed band 67 is output from the vehicle speed control unit 20 as a first output signal SOUT1 to a Vehicle Motion Controller (VMC) 36 (shown in FIG. 2) responsible for the trajectory planning and control of the host vehicle 1. The VMC 36 arbitrates between various trajectories and compensates for any speed deviations from the target trajectory. The VMC 36 generates a propulsion torque request suitable for maintaining the host vehicle 1 within the target operational speed band 67. The propulsion torque request is output by the VMC 36 as a second output signal SOUT2 to a Vehicle Supervisory Controller (VSC) 37. The VSC 37 is configured to intervene to ensure safety, for example if it determines that operating within the target operational speed band 67 could result in a collision, a speed limit violation or a traffic light violation. A closed-loop controller in the VSC 37 is used to correct for any discrepancies in the demanded torque request.

At least in certain embodiments, the techniques described herein for generating a target operational speed band offer particular advantages, including improved energy efficiency. One reason is the reduced number of times that the host vehicle 1 is required to stop, for example at the traffic control signals 18-$n$. The host vehicle 1 described herein has PHEV architecture which is capable of high power energy regeneration during a braking phase; however, anticipating a stopping event and starting to decelerate the host vehicle 1 earlier is more efficient, for example the engine 3 could be disengaged and stopped. It is also to be noted, that there is a two-path efficiency loss (motor/inverter/transmission/traction battery), from regenerating and then re-using the energy at a later stage. The techniques may offer larger benefits on vehicles having only an ICE, or a Mild Hybrid Electric Vehicle (MHEV), where there is no or limited regeneration capability. Furthermore, the requirement to decelerate the host vehicle 1 may be anticipated sooner, even when it is deemed appropriate the host vehicle 1.

The vehicle speed control unit 20 provides additional benefit as it is better able to adapt the powertrain control strategy anticipatively based on the expected speed profile rather than only knowledge of the current instantaneous vehicle speed. For example, if the target operational speed band contains a deceleration, then the powertrain strategy may for example turn the engine off early because it is determined in advance that the host vehicle 1 will start decelerating and that no propulsive torque is needed from the ICE 3. The increased use of the ERAD as the sole source of propulsion torque (i.e. operating as an EV), also facilitates mild charging of the traction battery 6, for example at low driver torque demands which shifts the engine torque to a more efficient point.

Dynamic programming is chosen as the optimisation method described herein due to the optimality of its results and its flexibility to be able to handle challenging non-linear problems such as the one considered here. Typically the computational effort required to perform dynamic programming is high, in particular when the number of model states and control inputs increase. The technique(s) described herein reduce model dimensionality, thereby reducing the amount of model evaluations required to optimise the target speed trajectories, as well as concentrating the optimization grid points to areas where accuracy is most needed. Further reductions in computational burden may be achieved by decoupling the speed optimisation from the powertrain usage optimisation. This modular approach may facilitate application of the techniques described herein across different vehicle architectures, including conventional vehicles, different hybrid architectures and electric vehicles. The speed optimisation stage is mostly independent of powertrain usage decisions, and only includes high-level vehicle parameters such as mass. Its main optimisation goals are minimizing trip time, anticipating road events ahead (such as traffic lights) while considering traffic rules such as speed limits as well as drivability constraints such as acceleration limits. The powertrain optimization stage contains a much more detailed model of the specific vehicle architecture and is responsible for deciding the relevant control decisions for that architecture so that the optimized speed profile is followed. For example, for a typical parallel hybrid the control decisions may be the torque split between the engine and the electric machine, as well as the gear selection. While the speed and powertrain optimisation procedures are mostly decoupled, some considerations about the powertrain can still be taken in the speed optimisation of the first stage. For example, depending on the current SOC level the algorithm cost function weights may be adapted to encourage certain types of speed profiles, for instance to increase SOC charging opportunities.

The optimisation algorithm described herein combines inputs including: traffic control timing, behaviour of other vehicles, drivability considerations as well as road profile and traffic signage. The information originates from a variety of sources which may include V2I communication with traffic lights and other infrastructure, V2V communication with other vehicles, communication with an e-Horizon digital map database and in-vehicle sensors. In addition, the optimisation algorithm may consider a driver identification algorithm to improve ability to predict actions of the host vehicle's driver (e.g. by having observed the driver's past behaviour). Not all of the input information is directly usable for the algorithm. For example, in terms of V2V communication, other vehicles are typically sending out their current location and movements. However, as the optimisation algorithm is performing optimisation of the future vehicle actions, the V2V information needs to be extended by a prediction of how other vehicles are likely to behave in the future. Such a prediction may be done by means of formulating a set of rules that determines the predicted behaviour, for example specifying that target vehicles should follow speed limits and keep a safe distance to their preceding vehicles.

The results of the optimisation may be used in a semi-autonomous longitudinal control feature that directly actuates the optimized speed trajectory and/or powertrain usage optimisation. In such a scheme, the optimized speed and powertrain usage profiles are sent directly to a controller that is responsible for final decision on the powertrain actions. The behaviour of other vehicles may differ from their predicted behaviour, for example a target vehicle 15-$n$ in front of the host vehicle 1 may decelerate unexpectedly. In such a case the vehicle speed control unit 20 may default back to a conventional radar-based ACC that would maintain a safe headway between the host vehicle 1 and the target vehicle 15-$n$. Alternatively, or in addition, the optimisation results can be used is in a driver-advisory feature that recommends actions to the driver who is in control of the longitudinal motion. In this scenario, the optimised speed profile may be used to recommend actions that would be beneficial for energy efficiency, for example to accelerate to certain speed or to lift off the accelerator pedal. In such a case, it is likely that there will be a difference between the original optimized speed profile and the one resulting from the driver actions. It is therefore important that the optimisation results are adapted to the new situation, either with additional logic that compares the original planned trajectory and the actual one, or by simply rerunning the optimisation.

It will be appreciated that various modifications may be made to the embodiment(s) described herein without departing from the scope of the appended claims.

The invention claimed is:

1. A controller for generating a target operational speed band for a host vehicle travelling along a route, the controller comprising:
processing means for receiving an input to identify a first time-dependent obstacle at a first location on the route, the first time-dependent obstacle being identified as hindering progress of the host vehicle during a first time period; and
memory means connected to the processing means;
wherein the processing means is configured to:
define the first time-dependent obstacle in a two-dimensional speed against distance map;
determine a first speed trajectory from a first point to a second point within the two-dimensional speed against distance map, the second point representing the first location on the route and the determined first speed trajectory representing the host vehicle arriving at the first location at a first arrival time, the first arrival time being outside the first time period; and
generate the target operational speed band;
wherein the first speed trajectory forms one of an upper limit and a lower limit of the target operational speed band; and the first speed trajectory is defined by a first acceleration limit of the host vehicle, and
wherein the processing means is configured to determine a cost of a target speed trajectory by applying an acceleration cost penalty in respect of each portion of the target speed trajectory having an acceleration that is one of a positive acceleration greater than a predefined positive acceleration threshold and a negative acceleration greater than a predefined negative acceleration threshold.

2. The controller as claimed in claim 1, wherein the first speed trajectory forms the lower limit of the target operational speed band; and a cost penalty is applied to a target speed trajectory which is less than the first speed trajectory.

3. The controller as claimed in claim 1, wherein the first speed trajectory forms the upper limit of the target operational speed band; and a cost penalty is applied to a target speed trajectory which is greater than the first speed trajectory.

4. The controller as claimed in claim 1, wherein the processing means is configured to identify a second time period during which the first time-dependent obstacle permits substantially unhindered progress of the host vehicle; and
wherein the target operational speed band is determined such that the first arrival time is inside said second time period.

5. The controller as claimed in claim 1, wherein the processing means is configured to:
determine a second speed trajectory from the first point to the second point within the two-dimensional speed against distance map, the second point representing the first location on the route and the determined second speed trajectory representing the host vehicle arriving at the first location at a second arrival time; and
determine the target operational speed band such that the second speed trajectory forms the other of the upper limit and the lower limit of the target operational speed band,
wherein the second arrival time is outside said first time period.

6. The controller as claimed in claim 5, wherein the first speed trajectory is defined by a first acceleration limit of the host vehicle.

7. The controller as claimed in claim 1, wherein the first obstacle comprises a target vehicle travelling along at least a portion of the route.

8. A controller for generating a target operational speed band for a host vehicle travelling along a route, the controller comprising:
processing means for receiving an input to identify a first time-dependent obstacle at a first location on the route, the first time-dependent obstacle including a target vehicle travelling along at least a portion of the route, and the first time-dependent obstacle being identified as hindering progress of the host vehicle during a first time period; and
memory means connected to the processing means;
wherein the processing means is configured to:
define the first time-dependent obstacle in a two-dimensional speed against distance map;
determine a first speed trajectory from a first point to a second point within the two-dimensional speed against distance map, the second point representing the first location on the route and the determined first speed trajectory representing the host vehicle arriving at the first location at a first arrival time, the first arrival time being outside the first time period; and
generate the target operational speed band;
wherein the first speed trajectory forms one of an upper limit and a lower limit of the target operational speed band; and the first speed trajectory is defined by a first acceleration limit of the host vehicle, and
wherein the first time period comprises a time period during which the target vehicle is predicted as travelling on a section of the route identified as being unfavorable for performing an overtaking maneuver.

9. The controller as claimed in claim 8, wherein the processing means is configured to:
determine a second speed trajectory from the first point to the second point within the two-dimensional speed against distance map, the second speed trajectory being calculated such that the host vehicle arrives at the second location at a second arrival time, wherein the second speed trajectory forms the other of the upper limit and the lower limit of the target operational speed band.

10. The controller as claimed in claim 9, wherein the second arrival time comprises a time that the target vehicle is predicted to arrive at the second location, the second location representing an end of the section of the route identified as being unfavorable for performing an overtaking maneuver.

11. A controller for generating a target operational speed band for a host vehicle travelling along a route, the controller comprising:
processing means for receiving an input to identify a first time-dependent obstacle at a first location on the route, the first time-dependent obstacle being identified as hindering progress of the host vehicle during a first time period; and memory means connected to the processing means;

wherein the processing means is configured to:
- define the first time-dependent obstacle in a two-dimensional speed against distance map;
- determine a first speed trajectory from a first point to a second point within the two-dimensional speed against distance map, the second point representing the first location on the route and the determined first speed trajectory representing the host vehicle arriving at the first location at a first arrival time, the first arrival time being outside the first time period; and
- generate the target operational speed band;

wherein the first speed trajectory forms one of an upper limit and a lower limit of the target operational speed band; and the first speed trajectory is defined by a first acceleration limit of the host vehicle, and wherein the processing means is configured to identify a second time period during which the first time-dependent obstacle permits substantially unhindered progress of the host vehicle;

the target operational speed band is determined such that the first arrival time is inside said second time period; and the second time period comprises a time period during which the target vehicle is predicted as travelling on a section of the route identified as being favorable for performing an overtaking maneuver.

12. The controller as claimed in claim 11, wherein the processing means is configured to:
identify a speed limit applicable for at least a part of the route between a current position of the host vehicle and the first location, wherein the speed limit defines at least a portion of the upper limit of the target operational speed band.

13. The controller as claimed in claim 11, wherein the processing means is configured to:
identify a plurality of obstacles on the route; and
generate a target operational speed band in respect of each obstacle identified on the route.

14. The controller as claimed in claim 13, wherein the first arrival time for arriving at the first obstacle is determined in dependence on an arrival time of the host vehicle at one or more other obstacle identified on the route.

* * * * *